United States Patent
Hildebrandt et al.

(10) Patent No.: US 9,133,887 B2
(45) Date of Patent: Sep. 15, 2015

(54) CONSTANT VELOCITY JOINT

(71) Applicant: GKN Driveline International GmbH, Lohmar (DE)

(72) Inventors: Wolfgang Hildebrandt, Siegburg (DE); Stephan Maucher, Siegburg (DE); Thomas Weckerling, Sankt Augustin (DE); Rolf Cremerius, St. Augustin (DE); Ida Benner, Troisdorf (DE); Hans-Jurgen Post, Bonn (DE); Anna Gremmelmaier, Sankt Augustin (DE)

(73) Assignee: GKN Driveline International GmbH, Lohmar (DE)

( * ) Notice: Subject to any disclaimer, the term of this patent is extended or adjusted under 35 U.S.C. 154(b) by 0 days.

(21) Appl. No.: 14/386,895

(22) PCT Filed: Mar. 26, 2013

(86) PCT No.: PCT/EP2013/056441
§ 371 (c)(1),
(2) Date: Sep. 22, 2014

(87) PCT Pub. No.: WO2013/144164
PCT Pub. Date: Oct. 3, 2013

(65) Prior Publication Data
US 2015/0072795 A1    Mar. 12, 2015

(30) Foreign Application Priority Data
Mar. 28, 2012 (DE) .......................... 10 2012 102 678

(51) Int. Cl.
*F16D 3/2245* (2011.01)
*F16D 3/2237* (2011.01)
(Continued)

(52) U.S. Cl.
CPC .............. *F16D 3/2237* (2013.01); *F16D 3/226* (2013.01); *F16D 3/2245* (2013.01); *F16D 3/24* (2013.01); *F16D 2003/22303* (2013.01); *F16D 2003/22309* (2013.01)

(58) Field of Classification Search
USPC .................................. 464/143, 145, 146, 906
See application file for complete search history.

(56) References Cited

U.S. PATENT DOCUMENTS

| 2,046,584 A | 7/1936 | Rzeppa |
| 5,122,096 A | 6/1992 | Aucktor et al. |

(Continued)

FOREIGN PATENT DOCUMENTS

| DE | 3939531 C1 | 6/1991 |
| DE | 19706864 C1 | 6/1998 |

(Continued)

OTHER PUBLICATIONS

International Search Report with Written Opinion dated Oct. 2, 2013 (8 pages).

*Primary Examiner* — Josh Skroupa
(74) *Attorney, Agent, or Firm* — Bejin Bieneman PLC

(57) ABSTRACT

A constant velocity joint comprises an outer joint part with a longitudinal axis and outer ball tracks, wherein the outer joint part comprises an attachment side and an aperture side; an inner joint part with a longitudinal axis and inner ball tracks; a torque transmitting ball in each pair of tracks; a ball cage with cage windows in which the balls are held, wherein in each angular position of the constant velocity joint there is enclosed an opening angle δ between an outer tangent T and an inner tangent T' at the ball, wherein at least one of the pairs of tracks is designed such that, inside a small articulation angle range, which comprises at least the joint central plane EM, in at least one joint articulation angle β, an opening angle δ amounts to zero, and that inside a larger articulation angle range, an aperture side opening angle δ of a ball moving towards the aperture side of the outer joint part and an attachment side opening angle δ of a ball moving at the same joint articulation angle β towards the attachment side of the outer joint part do not equal zero and open in the same axial direction.

20 Claims, 14 Drawing Sheets

Figure 1B:
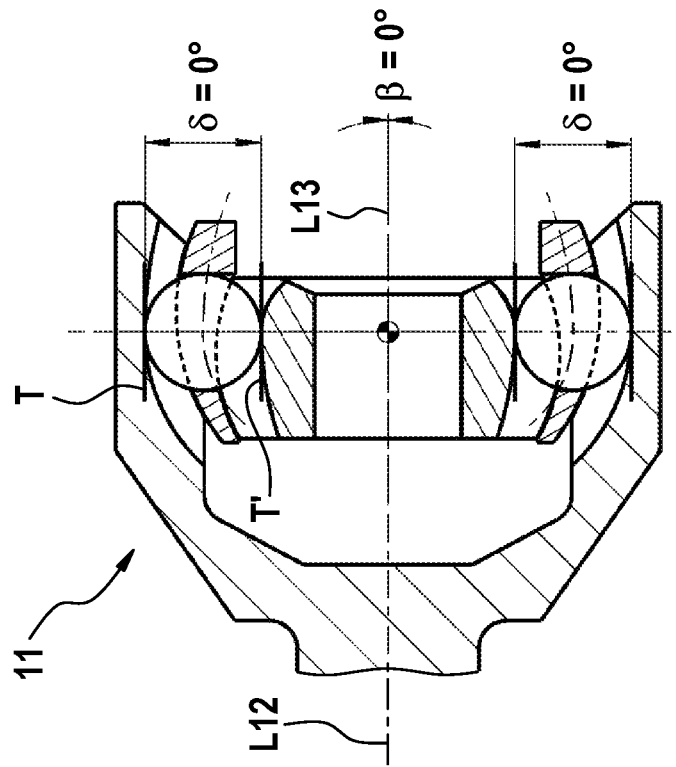

(51) Int. Cl.
   *F16D 3/226*  (2006.01)
   *F16D 3/24*   (2006.01)
   *F16D 3/223*  (2011.01)

(56) References Cited

U.S. PATENT DOCUMENTS 8,083,597 B2 * 12/2011 Oh et al. .................. 464/145
8,096,887 B2    1/2012 Oh et al.

FOREIGN PATENT DOCUMENTS

| DE | 102004018777 A1 | | 3/2005 |
| EP | 2119931 A1 | | 11/2009 |
| JP | 2003021158 A | | 1/2003 |
| WO | WO 2012005087 A1 | * | 1/2012 |
| WO | WO 2012026632 A1 | * | 3/2012 |
| WO | WO 2012169299 A1 | * | 12/2012 |

* cited by examiner

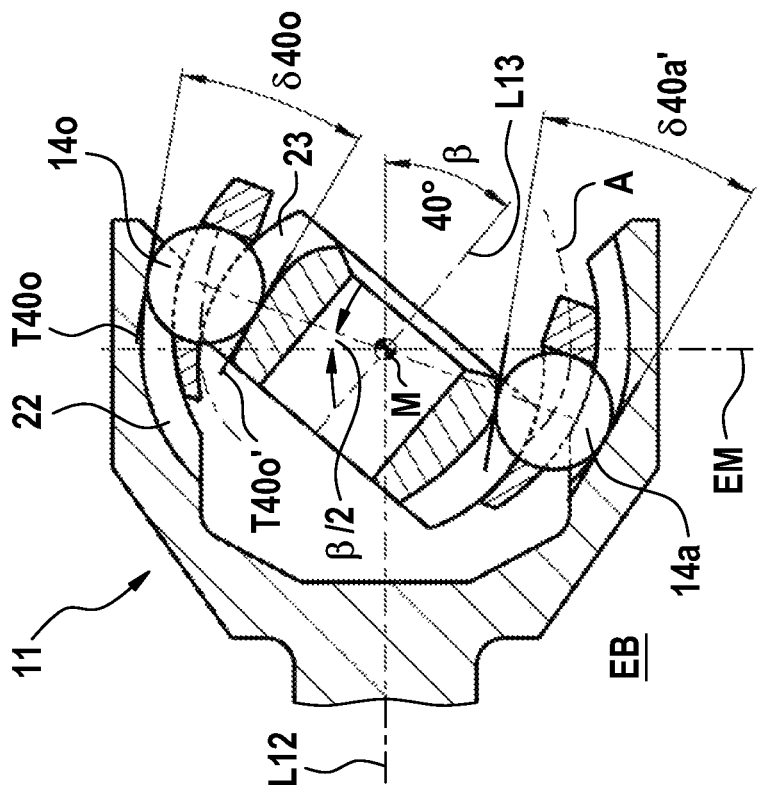
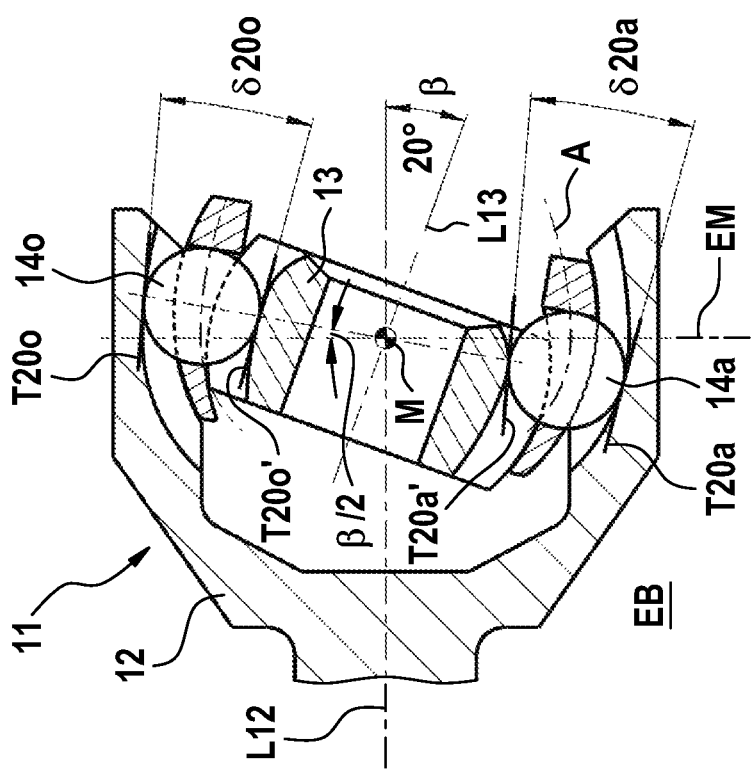

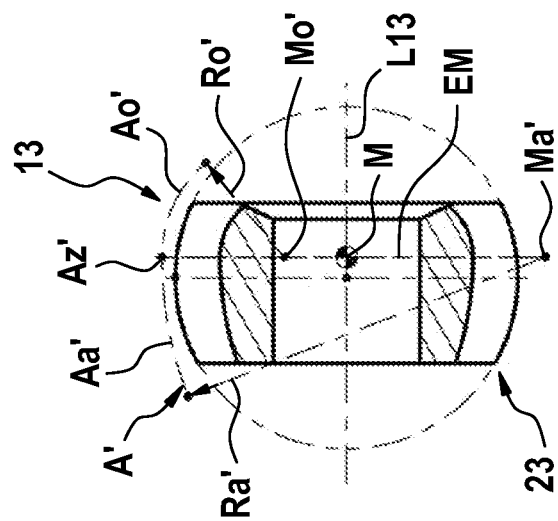
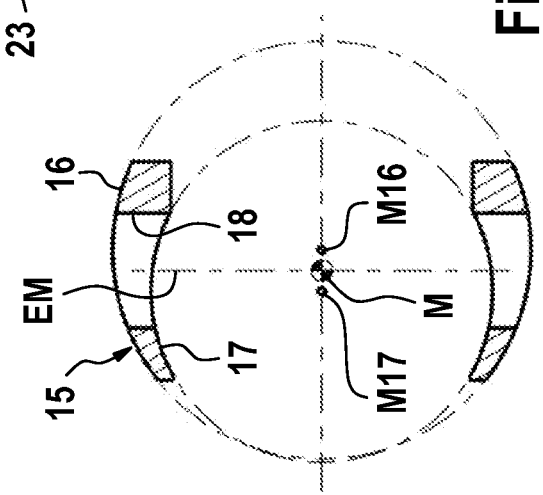
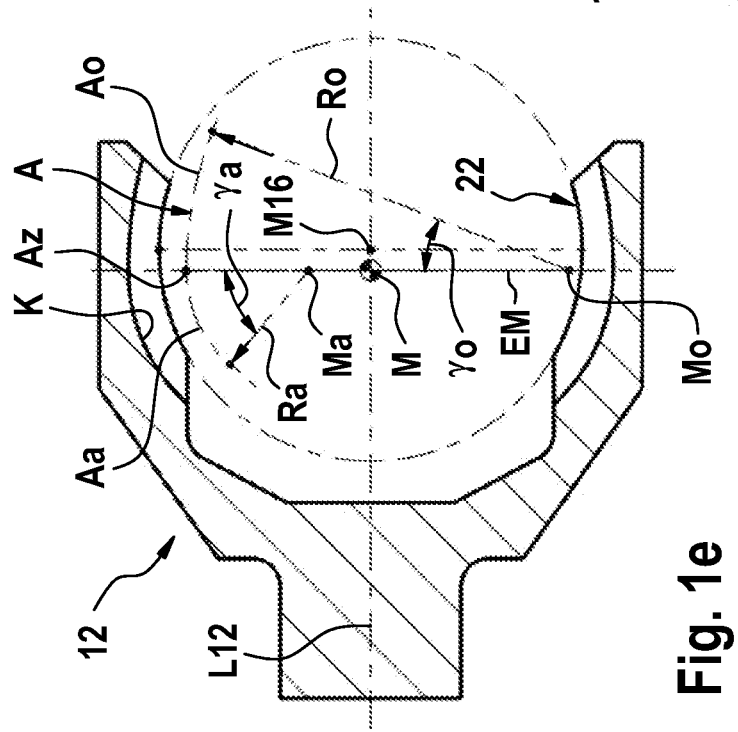
Fig. 1f
Fig. 1g
Fig. 1e

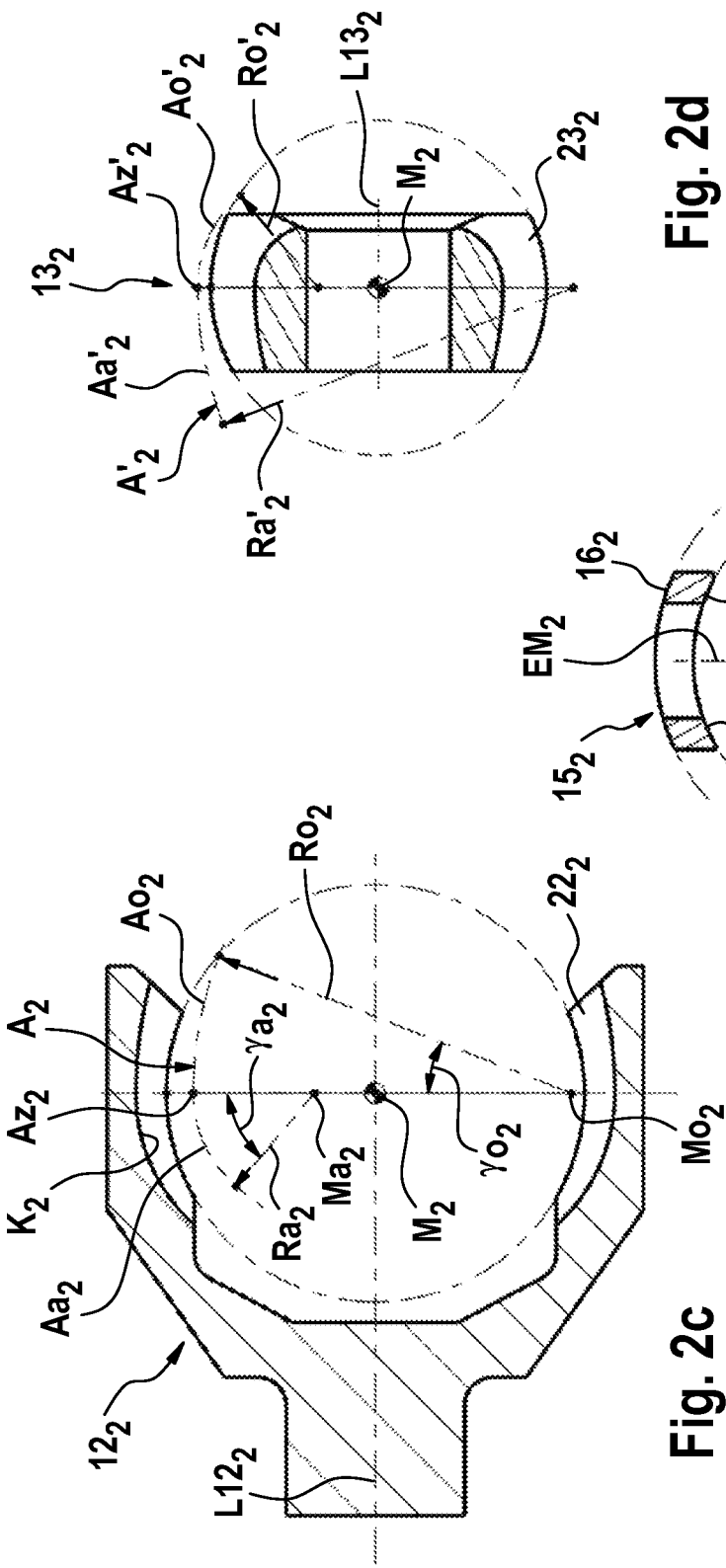

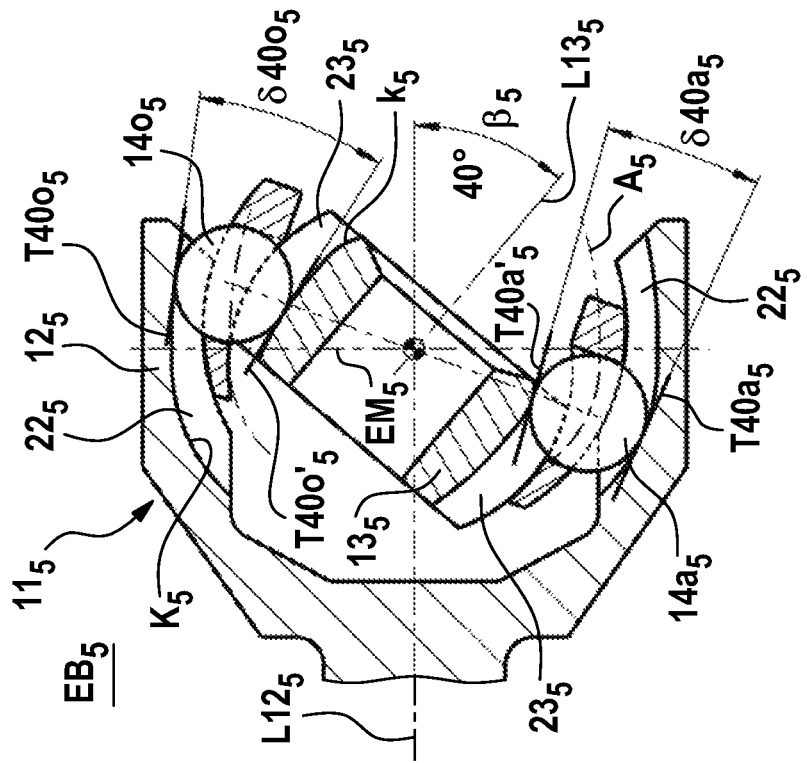
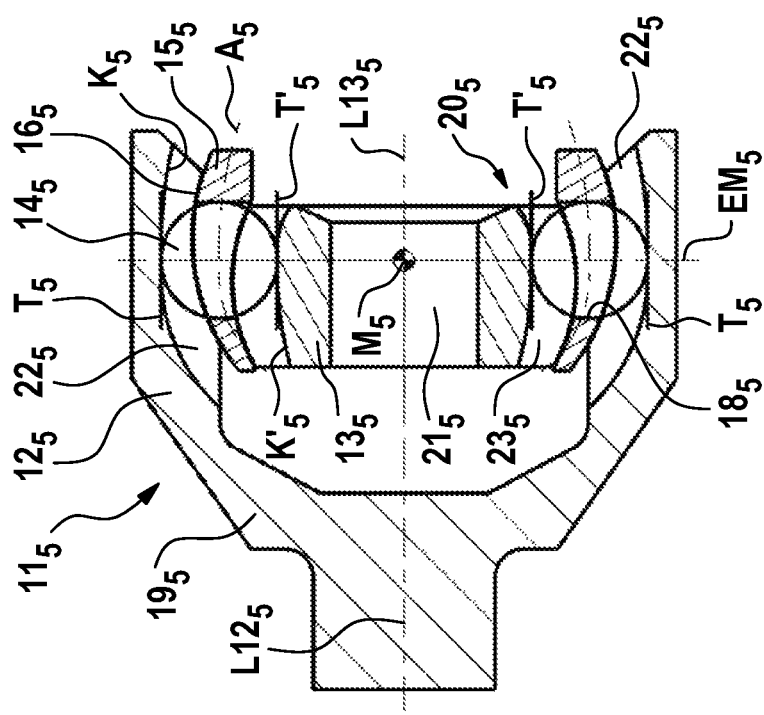
Fig. 5b
Fig. 5a

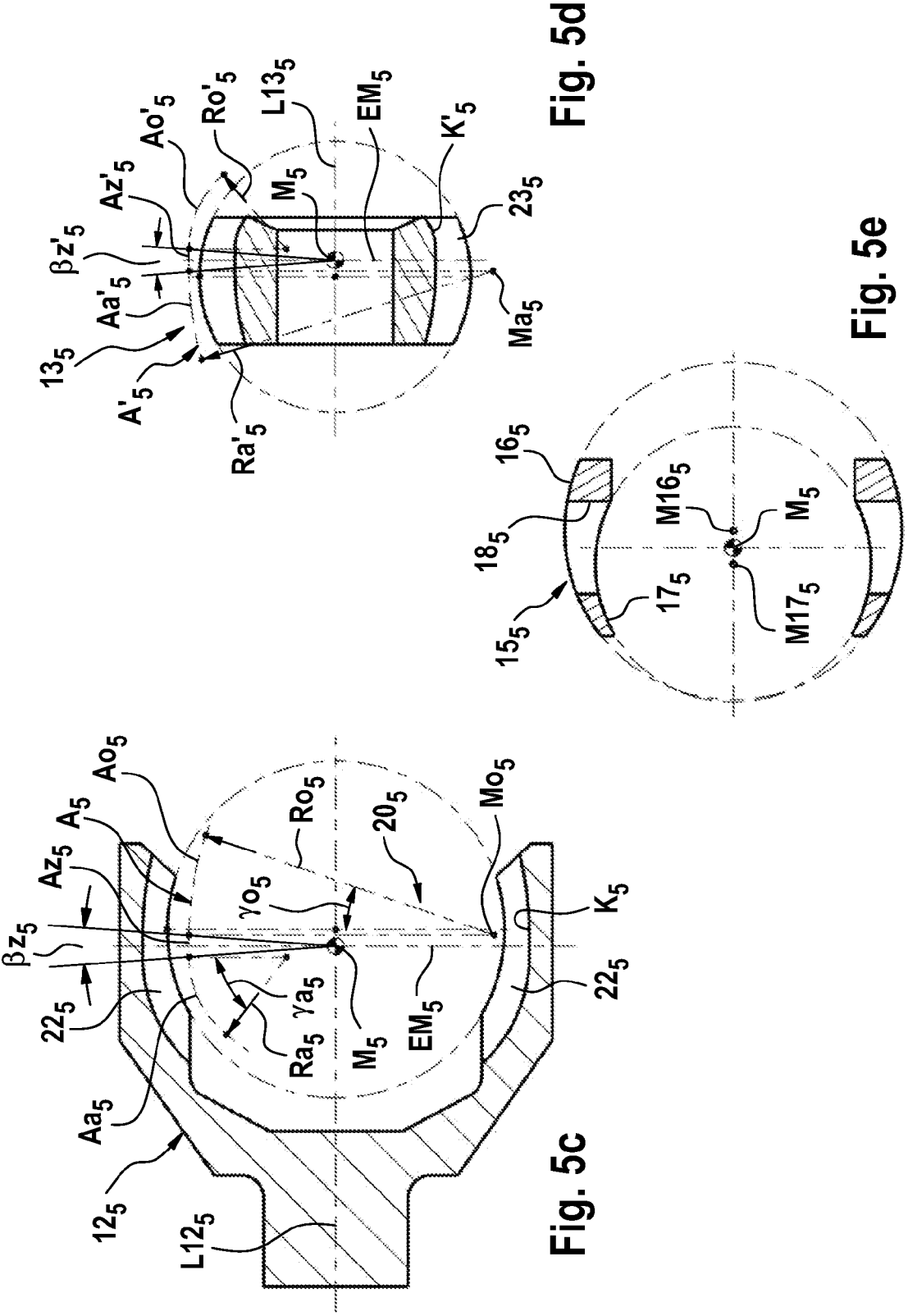

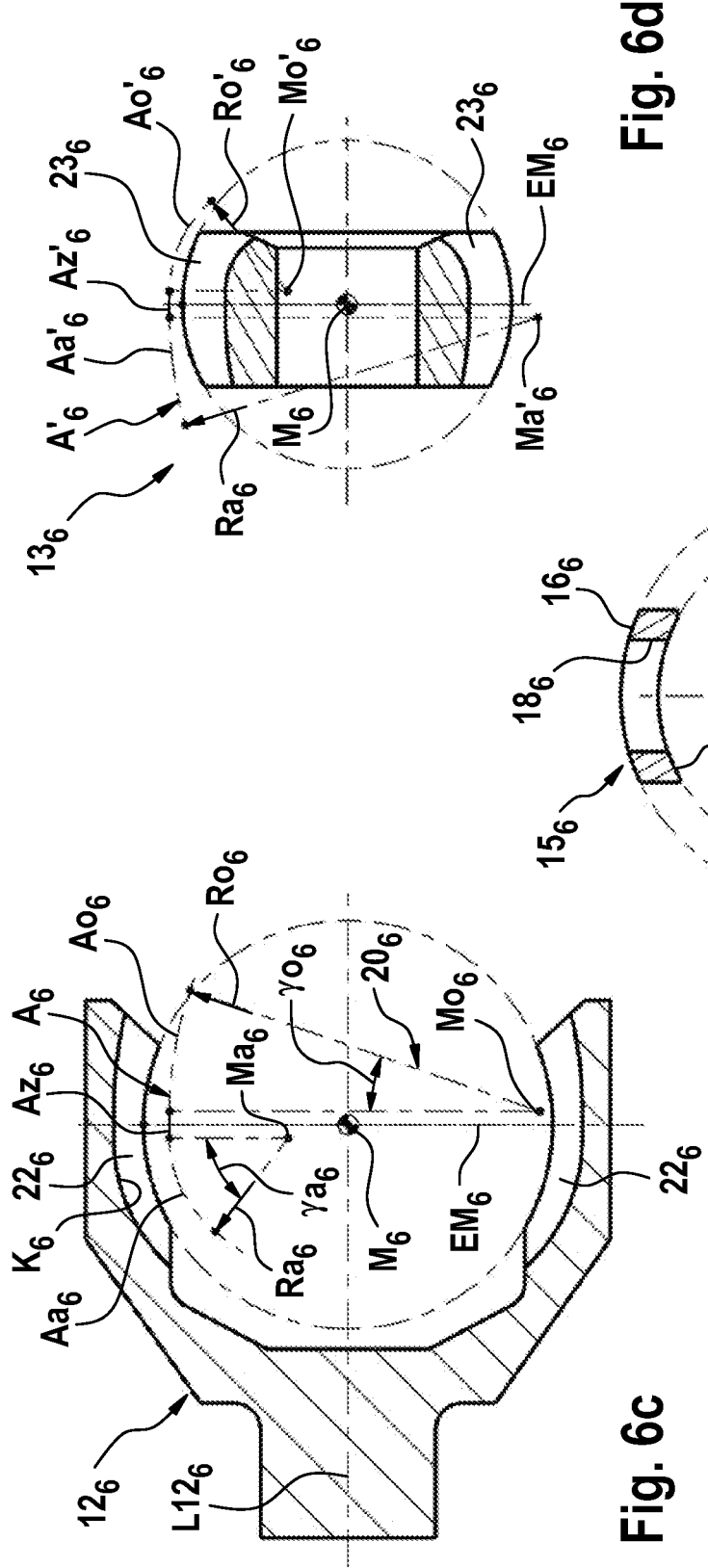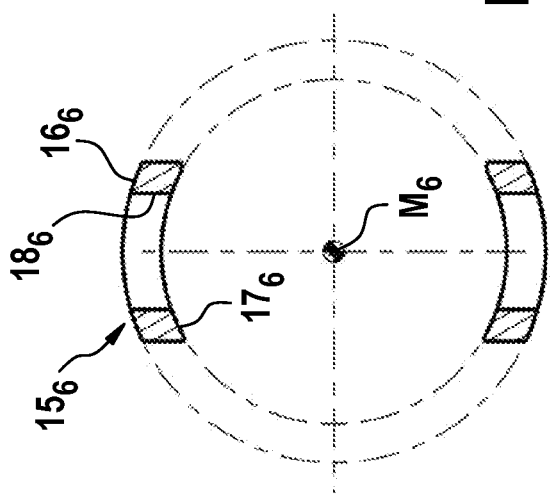

CONSTANT VELOCITY JOINT

CROSS-REFERENCE TO RELATED APPLICATIONS

This application claims priority to PCT International Application No. PCT/EP2013/056441, filed Mar. 26, 2013, which is in turn based upon and claims benefit of priority from German Patent Application No. DE 10 2012 102 678.5, filed Mar. 28, 2012, the entire contents of which prior applications are incorporated herein by reference in their entireties.

BACKGROUND

From U.S. Pat. No. 8,096,887 B2 a constant velocity joint is known in the form of a fixed joint. In one embodiment it is proposed that the ball tracks of the outer joint part comprise two circular arch portions with different centres and a straight portion positioned therebetween. The straight portion tangentially adjoins the two circular arch portions. The circular arch portions are designed such that, when the joint is articulated, an opening angle at the ball moving towards the aperture end and an opening angle at the ball moving towards the joint base open in opposite directions.

DE 197 06 864 C1 proposes a constant velocity joint wherein the centre lines of the outer and inner ball tracks are composed of two differently curved portions adjoining one another. Between the two curved portions there is formed a turning point, with a tangent in the turning point extending axis-parallel. The inner portions of the ball tracks of the outer joint part extend by 10° beyond the central joint plane towards the aperture end of the outer joint part.

From U.S. Pat. No. 2,046,584 different embodiments of constant velocity fixed joints are known. According to one embodiment it is proposed that the outer ball tracks and the inner ball tracks extend concentrically relative to the joint centre. The ball cage arranged between the outer joint part and the inner joint part comprises an inner spherical face which is guided relative to the outer joint part. The centres of the outer and inner spherical faces of the ball cage are positioned on the longitudinal axis and are axially offset relative to one another. According to another embodiment it is proposed that the centre of the outer ball tracks and the centre of the inner ball tracks on the longitudinal axis are axially spaced relative to one another. In this embodiment, the outer and the inner spherical face of the ball cage are designed so as to be concentric relative to the joint centre.

SUMMARY

A constant velocity joint is herein proposed for which, at small articulation angles, only low reaction forces occur between the joint components contacting one another, so that the friction forces are correspondingly low, and wherein, at larger articulation angles, good cage control properties are ensured. Accordingly, disclosed herein is a constant velocity joint for transmitting torque, the constant velocity joint having an outer joint part with outer ball tracks, an inner joint part with inner ball tracks, torque transmitting balls which are guided in pairs of outer and inner ball tracks, and a ball cage which receives the balls in circumferentially distributed windows and holds same in a common plane and, when the joint is articulated, guides the balls on to an angle-bisecting plane.

A constant velocity joint is proposed comprising an outer joint part with a longitudinal axis (L12) and outer ball tracks, wherein the outer joint part comprises an attachment side and an aperture side; an inner joint part with a longitudinal axis (L13) and inner ball tracks; wherein the outer ball tracks and the inner ball tracks form pairs of tracks; a torque transmitting ball in each pair of tracks, a ball cage which is arranged between the outer joint part and the inner joint part and comprises circumferentially distributed cage windows which each receive at least one of the torque transmitting balls; wherein the ball cage holds the balls in a joint central plane (EM), when the inner joint part is arranged coaxially relative to the outer joint part, and wherein the longitudinal axis (L12) of the outer joint part and the longitudinal axis (L13) of the inner joint part form a joint articulation plane (EB), when the inner joint part is articulated relative to the outer joint part by an articulation angle ($\beta$) which deviates from 0°; wherein in each angular position of the constant velocity joint an opening angle ($\delta$) is formed between an outer tangent (T) to the outer ball track and an inner tangent (T') to the inner ball track, if viewed in the joint articulation plane, wherein said outer tangent (T) extends through an outer contact point between the ball and the outer ball track and wherein said inner tangent (T') extends through an inner contact point between the ball and the inner ball track; wherein at least one of the pairs of tracks is designed such that for at least one joint articulation angle ($\beta$) within a small articulation angle range which comprises at least the joint central plane (EM), the opening angle ($\delta$) amounts to zero ($\delta=0°$), and for at least one joint articulation angle ($\beta$) within a large articulation angle range which comprises joint articulation angles ($\beta$) which are larger than a maximum joint articulation angle ($\beta$) of the small articulation angle range, an aperture-side opening angle ($\delta$) of a ball moving in the joint articulation plane (EB) towards the aperture side of the outer joint part and an attachment-side opening angle ($\delta$) of a ball (14) moving in the joint articulation plane (EB) towards the attachment side of the outer joint part unequal zero and open in the same axial direction.

Advantageously, within a central portion of the joint, i.e., within the small articulation angle range around the joint central plane, at least in one sectional plane, the constant velocity joint comprises a track shape wherein the opening angle is substantially zero. This is achieved in that at least one or some or all of the ball tracks of the constant velocity joint are designed such that in at least one sectional plane within the small articulation angle range two tangents at the outer and inner ball tracks extend substantially parallel relative to one another. Because of the parallel nature of the tangents at the ball tracks, respectively the parallel nature of the ball tracks themselves, the opening angle in this at least one sectional plane amounts to 0°, so that no resulting axial forces occur along the ball tracks between the ball tracks and the balls. As a result, in this at least one sectional plane within said central portion, the ball cage, too, is free from axial forces relative to the contact faces with the outer joint part and with the inner joint part, respectively. Overall, when the joint is in operation, the friction forces and thus also the friction losses within the central portion are minimised. In contrast to prior art constant velocity joints—which comprise an opening angle unequal to zero in the aligned condition and which generate friction movements between the outer joint part, the inner joint part and the cage due to the three-point contact between said components—the present constant velocity joint features a reduced friction.

At larger articulation angles, i.e., when the constant velocity joint is operated outside the central portion, the opening angles ($\delta$) of a ball moving towards the aperture side and towards the attachments, respectively, do not equal zero. Said opening angles can be greater or smaller than zero in a mathematical sense. The ball track design is such that the opening angles in the aperture side ball track portions point in the same axial direction as the opening angles in the attachment side ball track portions. Thus, good cage control conditions can be achieved. In this regard, opening angles pointing in the same axial direction is intended to mean that, in the joint articulation plane, the resulting force acting from the outer and inner ball tracks on a ball moving towards the attachment end comprises an axial force component which points in the same axial direction as the resulting axial force component which acts on a ball moving towards the aperture side. This design ensures that the ball cage is guided, respectively controlled at least approximately on to the angle-bisecting plane. Overall, the inventive constant velocity joint combines the advantages of low friction losses with a reliable control function in the case of large articulation angles.

The opening angles are defined between an outer tangent to the outer ball track and an inner tangent to the inner ball track, said outer and inner tangents extending through a respective contact region with the ball guided in the outer and the inner ball track. The opening angle refers to the joint articulation plane (EB) which is defined by the longitudinal axes of the outer joint part and of the inner joint part, respectively to a ball guiding pair of tracks positioned in the joint articulation plane. The region of contact between the ball and the ball track can be positioned directly in the joint articulation plane, for example in the case of a circular track cross-section whose cross-section radius corresponds to the radius of the ball, or in planes which extend parallel relative to the joint articulation plane and which are defined by the ball contact lines between the ball and the ball tracks, for instance if the cross-section of the ball tracks deviates from the circular shape. In the latter case, the projections of the tangents to the respective ball track are considered in the joint articulation plane, which projections enclose the opening angle.

In a built-in condition of the joint, a convoluted boot for sealing the joint chamber can be mounted with pretension, i.e., in such a way that the convoluted boot generates an axial force which loads the inner joint part and the outer joint part away from one another. In this way a cage control is generated within the small articulation angle range as a result of the pretension of the convoluted boot. In the pretensioned condition, the convoluted boot generates an axial force component which presses out any play existing between said joint components. A sudden change in load, for example from a torque-free condition to a condition of high torque, does not cause the cage to abruptly strike against the inner joint part and outer joint part, respectively, so that any undesirable noise is avoided. The pretensioning force can range between 30 N and 150 N (newtons).

The central portion of the constant velocity joint within which, for at least one angular position, the opening angle substantially equals zero ($\delta=0°$) is defined by a small joint articulation angle ($\beta_0$) of $\pm 2°$ around the joint central plane (EM). This means that the joint central portion is defined by the path which is covered by a ball within the respective ball track in the joint articulation plane EM upon rotation of the joint when articulated by an articulation angle of up to $\pm 2°$. The central portion can also be defined within a smaller articulation angle of up to $\pm 1°$ around the joint central plane (EM). In any case, the joint central portion and the small articulation angle range, respectively, comprise at least the joint central plane (EM).

According to a preferred embodiment, it is proposed that when the inner joint part is articulated relative to the outer joint part by a joint articulation angle $\beta$, which is positioned outside a joint articulation angle of $\pm 2°$, and inside a joint articulation angle of $\pm 8°$, at least one of the opening angles $\delta o$ at the aperture side and the opening angle $\delta a$ at the attachment side is greater than 0° and smaller than $\pm 8°$ with regard to the absolute value, more particularly smaller than $\pm 6°$. This embodiment ensures that, in the portions directly adjoining the central portion towards the aperture side and the attachment side, axial force components are applied to the balls located in the joint articulation plane, which leads to good steering or control conditions of the cage. In said articulation angle range $\beta$ of up to $\pm 8°$, the forces acting on the balls are low, because of the relatively small opening angle $\delta$ of less than $\pm 8°$, which, in an advantageous way, leads to low friction losses.

When the joint rotates under articulated conditions, the torque transmitting balls move along the ball tracks. If viewed in the joint articulation plane, the ball moving towards the aperture end of the outer joint part is guided into an aperture side track portion of the outer joint part and into an attachment side track portion of the inner joint part. The ball moving towards the attachment side of the outer joint part is guided into an attachment side track portion of the outer joint part and into an aperture side track portion of the inner joint part. According to an advantageous embodiment at least one of the attachment-side and aperture-side track portions of the outer joint part as well as of the corresponding aperture-side and attachment-side track portions of the inner joint part, within which the first and the second opening angle $\delta$ point in the same axial direction, extends over a track angle $\beta/2$ of up to at least 10° around the joint centre M relative to the joint central plane EM, starting from the respective point of transition to the central track portion, e.g., of up to at least 20°. In a preferred embodiment, both the aperture-side and the attachment-side track portions of the outer joint part and of the inner joint part which lead to a track opening pointing in the same axial direction upon articulation of the joint, extend over said track angle range $\beta/2$ of up to at least 10°, e.g., of up to at least 20°.

The track angle $\beta/2$ defines the angle which is enclosed between the joint central plane EM and a radius around the joint centre M through the ball centre of one of the torque transmitting balls. In each angular position of the joint, the track angle $\beta/2$ commonly amounts to half the joint articulation angle $\beta$, i.e., the track angle $\beta/2$ of up to at least 10° corresponds to a joint articulation angle $\beta$ of 20°. However, it cannot be excluded that the balls can also be controlled on to a common plane which, up to a certain amount, can also deviate from the angle-bisecting plane.

According to an embodiment, the ball cage comprises a spherical outer face for guiding the ball cage relative to an inner face of the outer joint part, and a spherical inner face for guiding the ball cage relative an outer face of the inner joint part, wherein there is provided an axial offset between a centre of the spherical outer face and a centre of the spherical inner face. This measure ensures good cage controlling, and steering conditions, when the constant velocity joint is articulated.

According to an embodiment, radial play is provided between the outer spherical face of the ball cage and the inner spherical face of the outer joint part and/or between the spherical inner face of the ball cage and the spherical outer face of the inner joint part. In this way, a certain axial play is achieved between the inner joint part and the outer joint part, which, in an advantageous way disconnects any vibrations when the joint is in operation.

When the balls move along the outer and inner ball tracks the centres of the balls define an outer centre line (A) and an inner centre line (A'), respectively, if viewed in the joint articulations plane. According to an embodiment it is proposed that the centre lines, along the length of same, each comprise at least two track portions with different curvatures. The at least two track portions with different curvatures may be positioned within the central track portion and/or within the aperture side track portion and/or within the attachment side track portion of the outer and inner ball tracks. It is also possible that the centre lines comprise at least two partial portions with different curvatures within at least one of the attachment side track portion and the aperture side track portion.

Preferably, the centre lines comprise a change in curvature in the central track portion, more particularly in the point of intersection with the joint central plane (EM). In this context, change in curvature refers to any change of the gradient of the centre line in a mathematical sense, such as a change from a circular arch with a greater first radius to a circular arch with a smaller second radius, or to a straight line. More particularly, it is also possible to propose that the curvature changing point is a turning point in the mathematical sense, i.e., the curvature of the track centre line changes the algebraic sign in the turning point, for instance a circular arch with a first direction of curvature to a circular arch with an opposed second direction of curvature. It is understood that the track centre line can also be a higher order curve, with change in curvature in this case also referring to a change in the gradient along the higher order curve.

It is disclosed herein that in a constant velocity joint, at least one of the pairs of tracks comprises a shape having at least one opening angle of substantially zero within the central portion and, in the case of greater angular movements outside the central portion, having opening angles which are not equal to zero and which open in corresponding axial directions. It is understood that also two or more pairs of tracks can comprise said shape, with each two pairs of tracks of said embodiment being positioned diametrically opposite one another. Independently of the number of inventive pairs of tracks it is disclosed in any case, that also the remaining pairs of tracks comprise opening angles which point in the same axial direction as the opening angles of the inventive pairs of tracks. Preferably, all pairs of tracks are identical in shape, i.e. the opening angles (δ) of all balls being positioned in the joint articulation plane outside the central track portion of the pairs of tracks, open in the same axial direction when the joint is articulated. Furthermore, to achieve advantageous production conditions is it preferably proposed that all the outer ball tracks and all the inner ball tracks, respectively, are identical relative to one another.

According to a first possibility, it is proposed for the central portion that the outer ball track is designed such that an outer contact line (K) in the central track portion is formed by a straight line which extends parallel to the longitudinal axis (L12) of the outer joint part and that the inner ball track is designed such that an inner contact line (K') in the central track portion is formed by a straight line which extends parallel to the longitudinal axis (L13) of the inner joint part. The portions which adjoin the central portion at the attachment side and at the aperture side comprise a shape which deviates from a parallel straight line, e.g., they take an arch-like course forming opening angles which do not equal zero and extend in the same axial direction. Theoretically, the parallel straight lines of the inner and outer ball tracks can also be infinitesimally short; these infinitesimally short straight track portions would then each form a curve changing point with a gradient equalling zero.

According to a second possibility it is disclosed with reference to the central portion that the outer ball track is designed such that the outer contact line (K) in the central track portion is formed by an outer circular arch around the joint centre and that the inner ball track is designed such that the inner contact line (K') in the central track portion is formed by an inner circular arch around the joint centre. The portions which adjoin the central portion at the attachment side and at the aperture side comprise a shape which deviates from the circular arches extending concentrically relative to the joint centre, for instance a circular arch around a centre which is axially and/or radially offset relative to the joint centre or a curve of a higher order.

In the track portion adjoining the central portion at the attachment side of the outer joint part, the outer ball track can be designed such that the centre line (A) extends radially inside or radially outside a circular arch portion (CR) defined by a reference radius (RR), wherein the reference radius (RR) extends around the joint centre (M) through a central plane intersection between the centre line (A) and the joint central plane (EM).

The track portion adjoining the central portion at the aperture side of the inner joint part, is designed in accordance with the track portion of the outer joint part at the attachment side, which means that the aperture side track portion of the inner joint part is designed such that the associated track centre line of said track portion is mirror-symmetric relative to the track centre line of the attachment side track portion of the outer joint part with reference to an angle-bisecting plane. This applies to each of the pairs of tracks.

In more concrete terms the outer ball track can be designed such that the centre line (A) in the attachment side track portion of the outer joint part comprises at least one of the following embodiments:
- a circular arch portion with a radius (R) around a circular arch centre which is positioned in the joint central plane (EM) and which, relative to the longitudinal axis (L12) of the outer joint part (12) comprises a radial offset towards the outer ball track;
- a circular arch portion with a radius (R) around a circular arch centre which is positioned on the longitudinal axis (L12) of the outer joint part and which, relative to the joint central plane (EM), comprises an axial offset towards the attachment end.

In the track portion adjoining the central portion at the aperture side of the outer joint part, the outer ball track can be designed such that the centre line (A) in said aperture side track portion it extends radially outside or radially inside of a circular arch portion defined by a reference radius (RR), wherein the reference radius (RR) extends around the joint centre (M) and through a central plane intersection between the centre line (A) and the joint central plane (EM).

In this embodiment, too, the inner ball track, with reference to an angle-bisecting plane between the longitudinal axis (L12) of the outer joint part and the longitudinal axis (L13) of the inner joint part, extends mirror-symmetrically relative to the outer ball track.

In more concrete terms it is disclosed that the outer ball track is designed such that the centre line (A) in the aperture side track portion of the outer joint part comprises at least one of the following embodiments:
- a circular arch portion with the radius (R) around a circular arch centre which is positioned in the joint central plane (EM) and which comprises a radial offset pointing away from the outer ball track;
- a circular arch portion with the radius (R) around a circular arch centre which is positioned on the longitudinal axis (L12) of the outer joint part and, relative to the joint central plane (EM), comprises an axial offset towards the aperture end.

According to an embodiment it is disclosed that the centre line (A) in the attachment side track portion of the outer joint part extends radially inside the circular arch portion defined by the reference radius (RR), that the centre line (A) in the aperture side track portion of the outer joint part extends radially outside the circular arch portion defined by the reference radius (RR), that the centre of the spherical outer face of the ball cage, relative to the joint centre, comprises an axial offset towards the aperture end, and that the centre of the spherical inner face of the ball cage, relative to the joint centre, comprises an axial offset towards the attachment end.

Said embodiment combines the advantages of low friction losses at small articulation angles with reliable cage control, respectively cage steering characteristics at greater articulation angles.

By taking into account the specific requirements to be met by the constant velocity joint, the number of pairs of tracks and of the torque transmitting balls can be selected accordingly. Generally, the driveline of a motor vehicle comprises constant velocity joints with six or eight balls, with any other numbers, even an uneven number, also being conceivable.

Because of the way in which the ball cage is guided relative to the spherical inner face of the outer joint part and relative to the spherical outer face of the inner joint part, the constant velocity joint is provided in the form of a fixed type joint which permits plunging movements only within the limits of the axial play between the outer joint part and the inner joint part. However, it is also conceivable to axially free the cage relative to the inner face of the outer joint part and relative to the outer face of the inner joint part, so that the joint would then be provided in the form of a plunging joint.

Figure 1A:
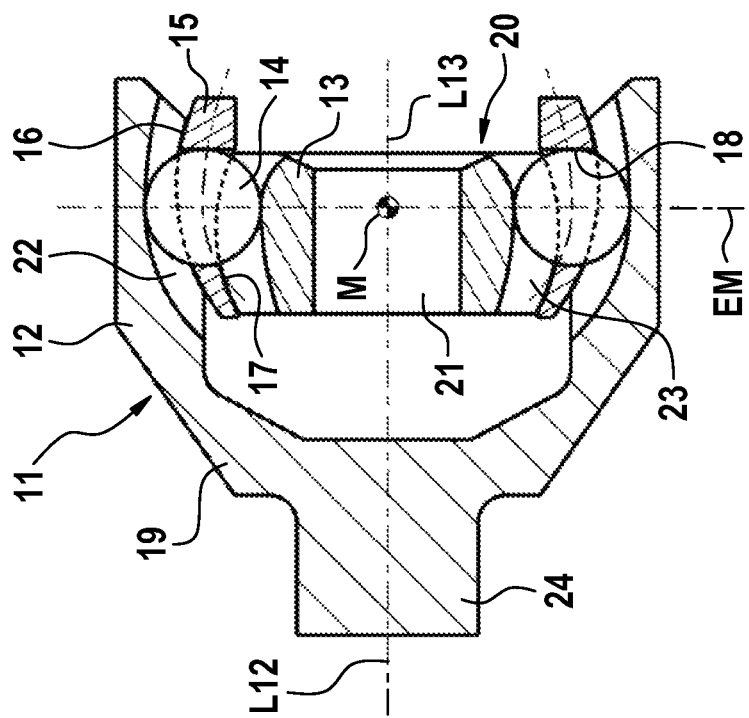

Example embodiments will be explained below with reference to the drawings, wherein:

FIG. 1a) shows an exemplary constant velocity joint in a first embodiment in a longitudinal section.

FIG. 1b) shows the joint according to FIG. 1a) with tangents at the ball tracks, in the joint central plane.

FIG. 1c) shows the joint according to FIG. 1a) when articulated by an articulation angle of 20°.

FIG. 1d) shows the joint according to FIG. 1a) when articulated by an articulation angle of 40°.

FIG. 1e) shows the outer joint part of the joint according to FIG. 1a) in a longitudinal section.

FIG. 1f) shows the inner joint part of the joint according to FIG. 1a) in a longitudinal section.

FIG. 1g) shows the ball cage of the joint according to FIG. 1a) in a longitudinal section.

Figure 1H:
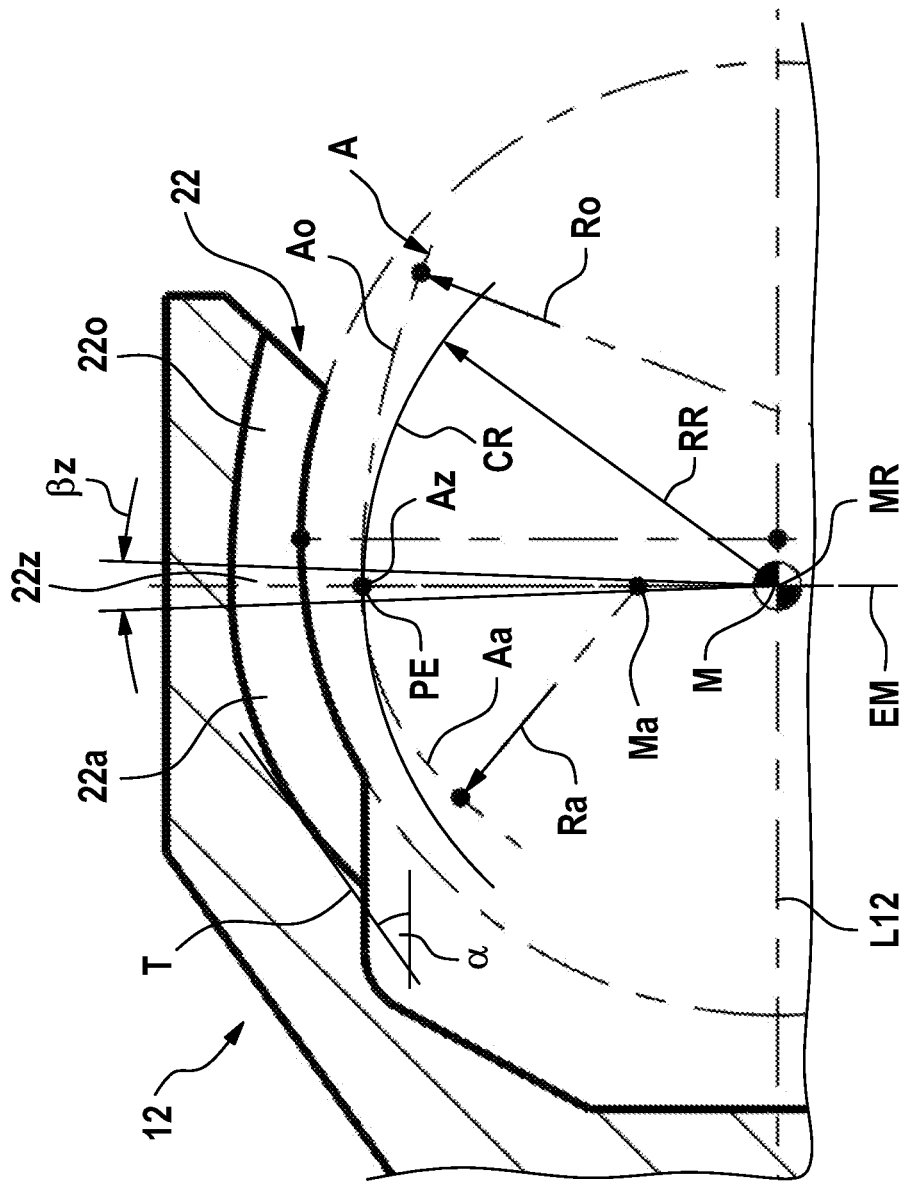

FIG. 1h) shows the outer joint part of the joint according to FIG. 1a) in a longitudinal section in an enlarged view with further details.

Figure 2B:
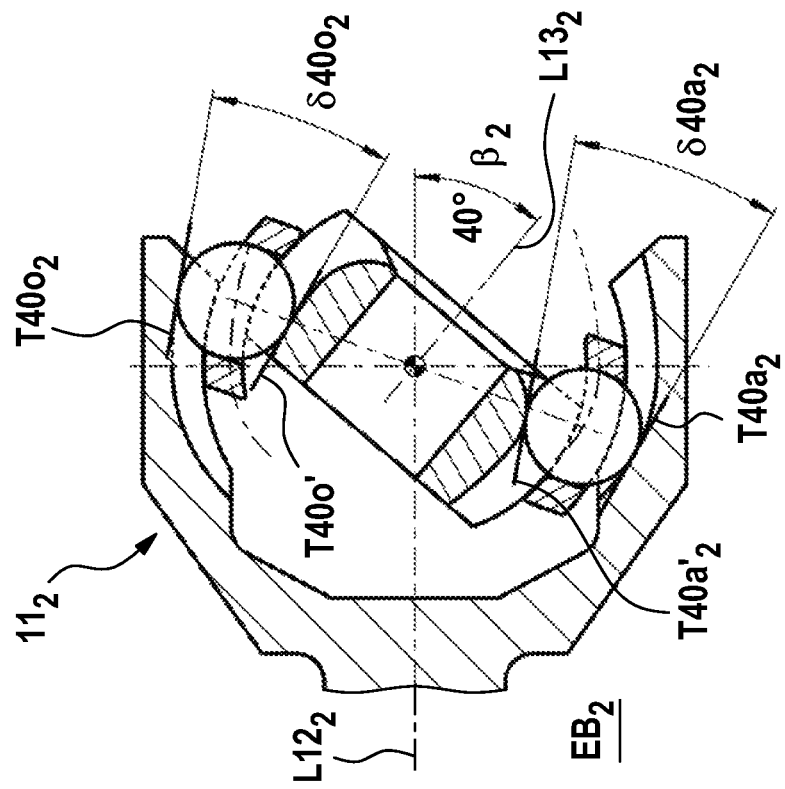
Figure 2A:
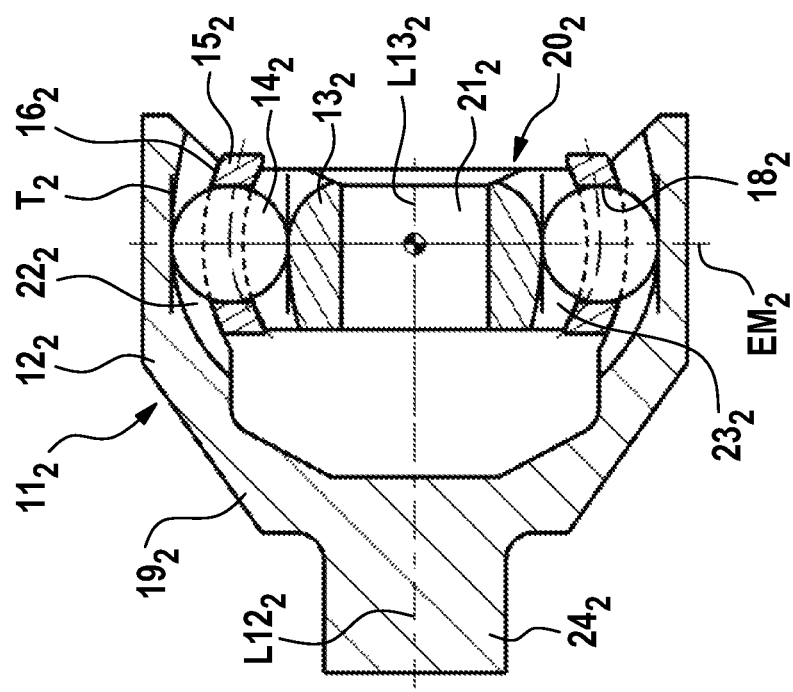

FIG. 2a) shows an exemplary constant velocity joint in a second embodiment in a longitudinal section in an aligned position.

FIG. 2b) shows the joint according to FIG. 2a) when articulated by an articulation angle of 40°.

FIG. 2c) shows the outer joint part of the joint according to FIG. 2a) in a longitudinal section.

FIG. 2d) shows the inner joint part of the joint according to FIG. 2a) in a longitudinal section.

FIG. 2e) shows the ball cage of the joint according to FIG. 2a) in a longitudinal section.

Figure 3B:
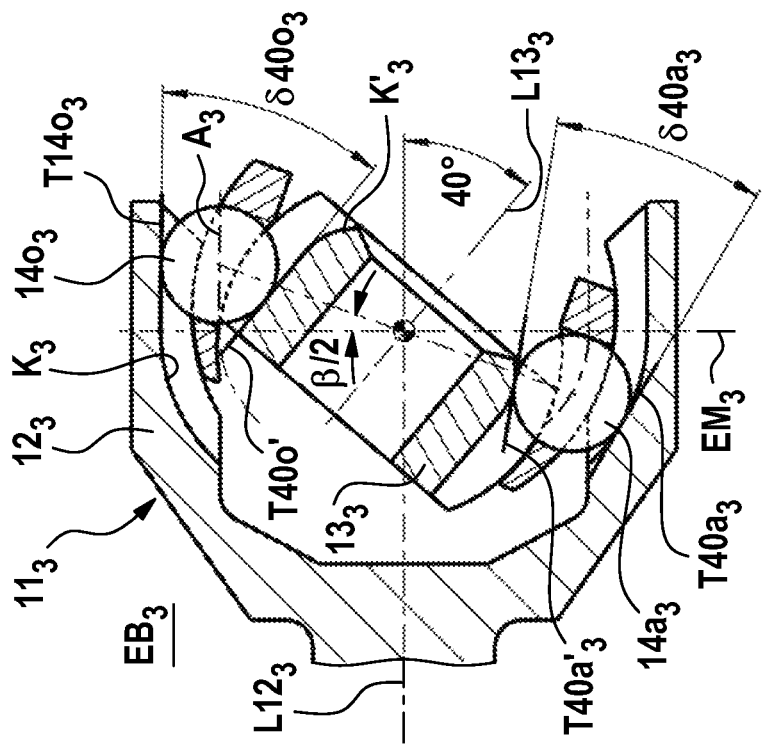
Figure 3A:
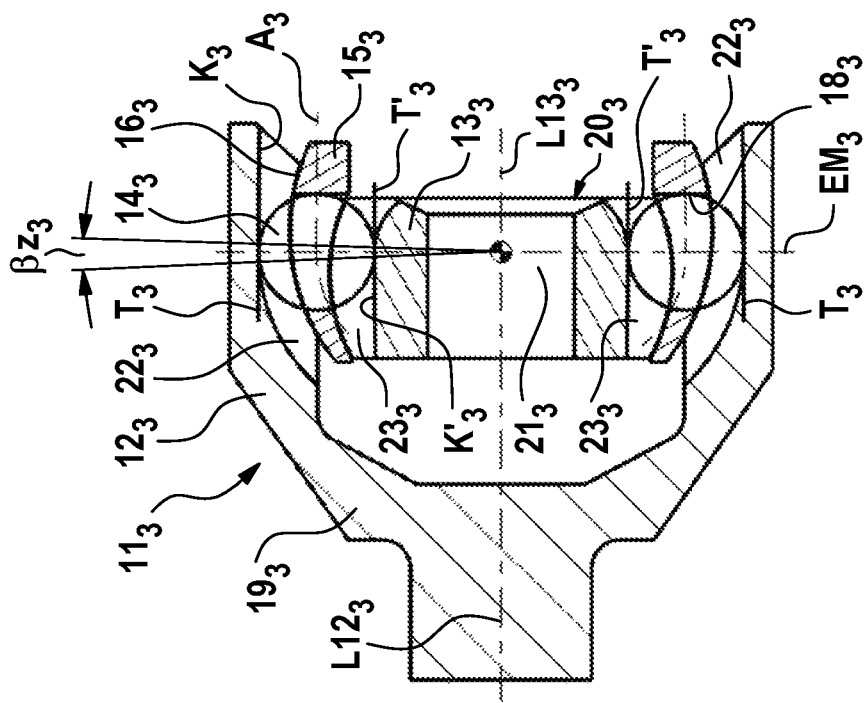

FIG. 3a) shows an exemplary constant velocity joint in a third embodiment in a longitudinal section in an aligned position.

FIG. 3b) shows the joint according to FIG. 3a) when articulated by an articulation angle of 40°.

Figure 3D:
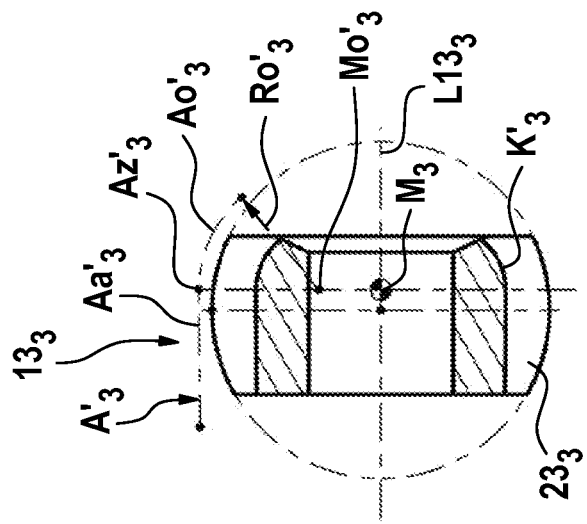
Figure 3E:
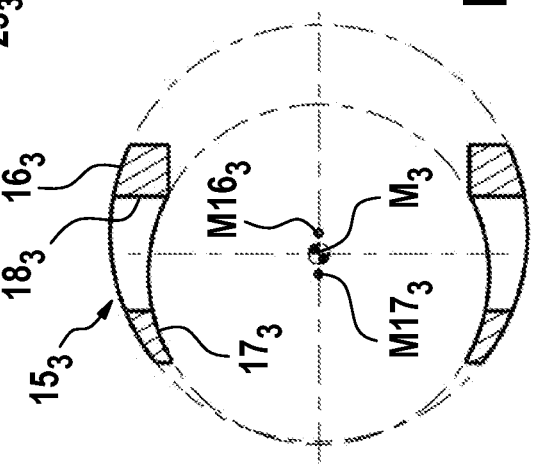
Figure 3C:
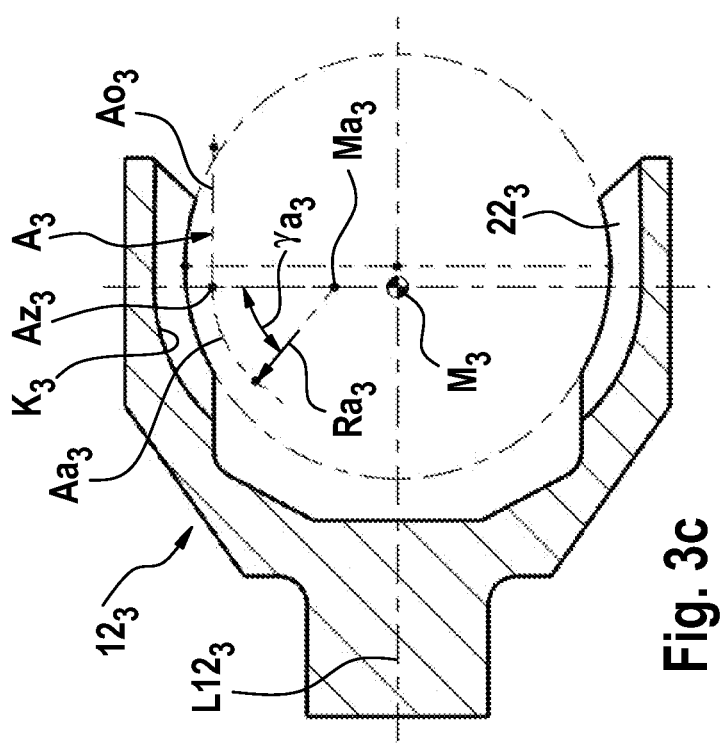

FIG. 3c) shows the outer joint part of the joint according to FIG. 3a) in a longitudinal section.

FIG. 3d) shows the inner joint part of the joint according to FIG. 3a) in a longitudinal section.

FIG. 3e) shows the ball cage of the joint according to FIG. 3a) in a longitudinal section.

Figure 4B:
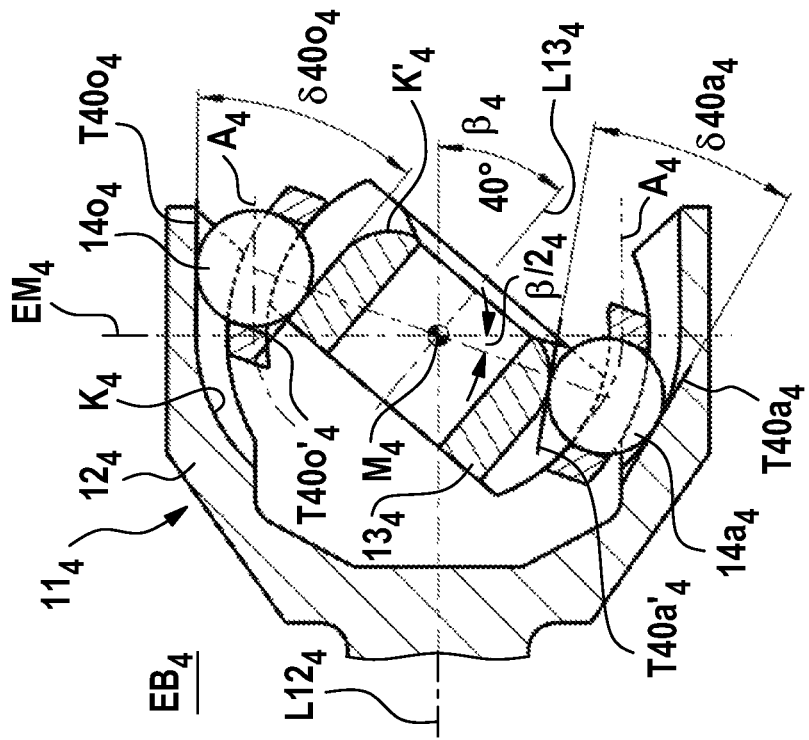
Figure 4A:
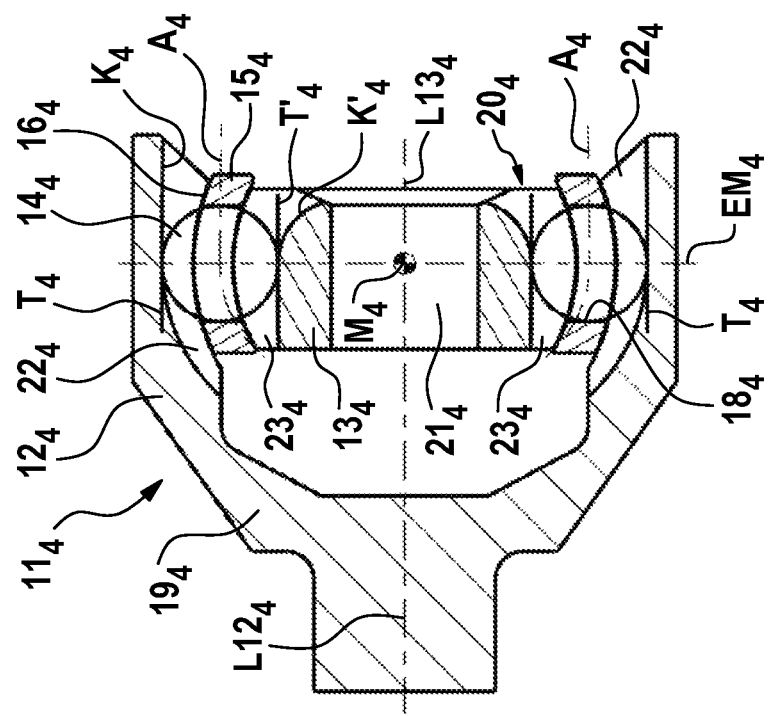

FIG. 4a) shows an exemplary constant velocity joint in a fourth embodiment in a longitudinal section in an aligned position.

FIG. 4b) shows the joint according to FIG. 4a) when articulated by an articulation angle of 40°.

Figure 4D:
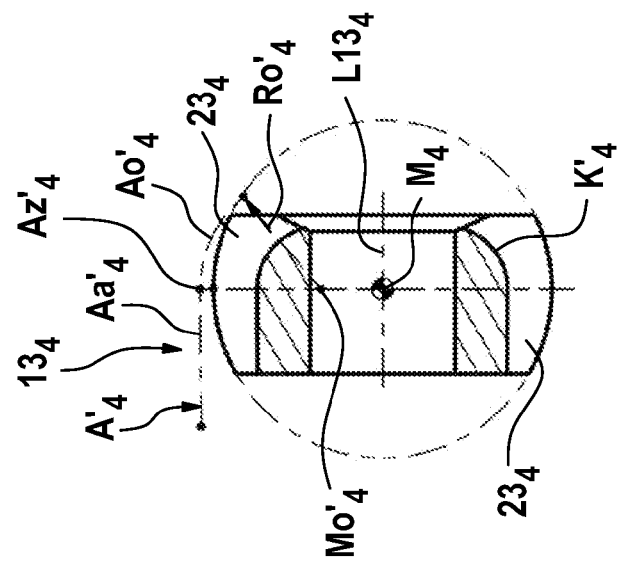
Figure 4E:
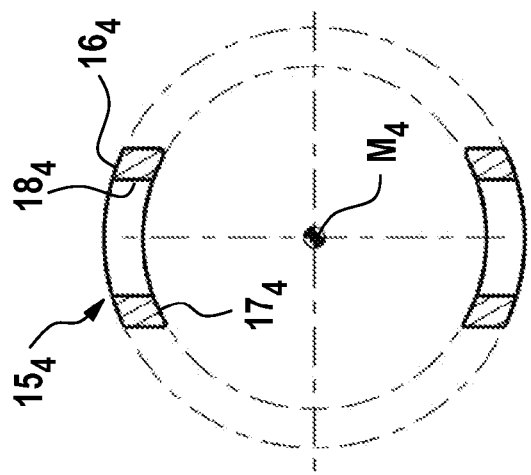
Figure 4C:
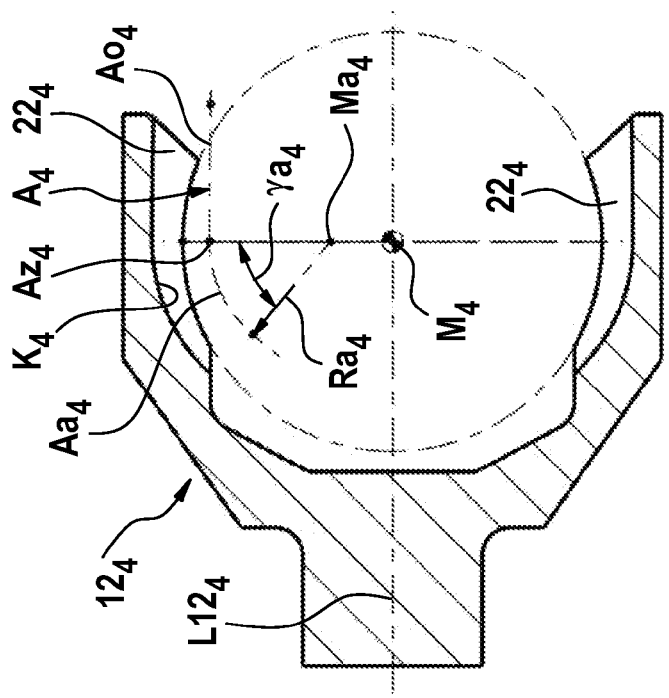

FIG. 4c) shows the outer joint part of the joint according to FIG. 4a) in a longitudinal section.

FIG. 4d) shows the inner joint part of the joint according to FIG. 4a) in a longitudinal section.

FIG. 4e) shows the ball cage of the joint according to FIG. 4a) in a longitudinal section.

FIG. 5a) shows an exemplary constant velocity joint in a fifth embodiment in a longitudinal section in an aligned position.

FIG. 5b) shows the joint according to FIG. 5a) when articulated by an articulation angle of 40°.

FIG. 5c) shows the outer joint part of the joint according to FIG. 5a) in a longitudinal section.

FIG. 5d) shows the inner joint part of the joint according to FIG. 5a) in a longitudinal section.

FIG. 5e) shows the ball cage of the joint according to FIG. 5a) in a longitudinal section.

Figure 6B:
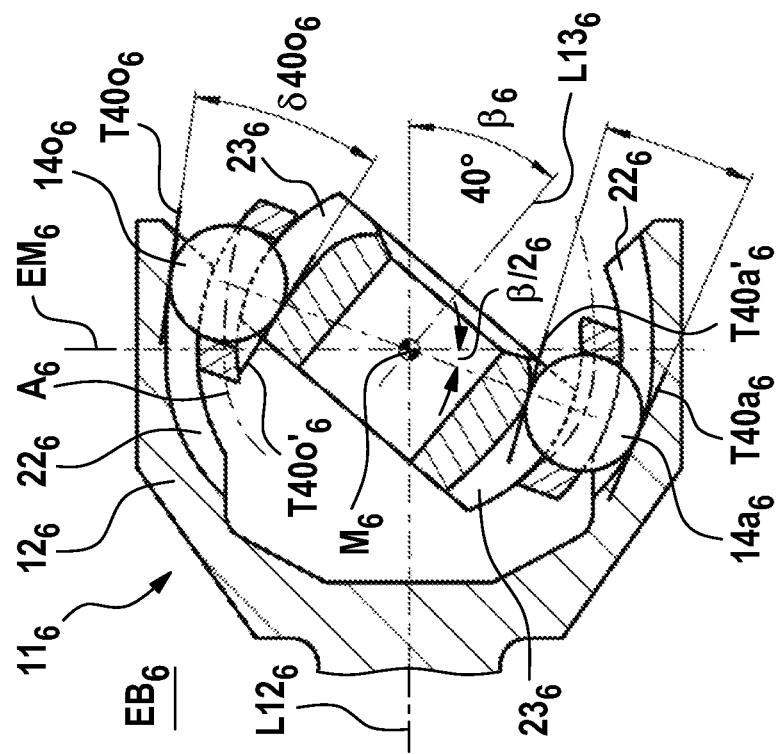
Figure 6A:
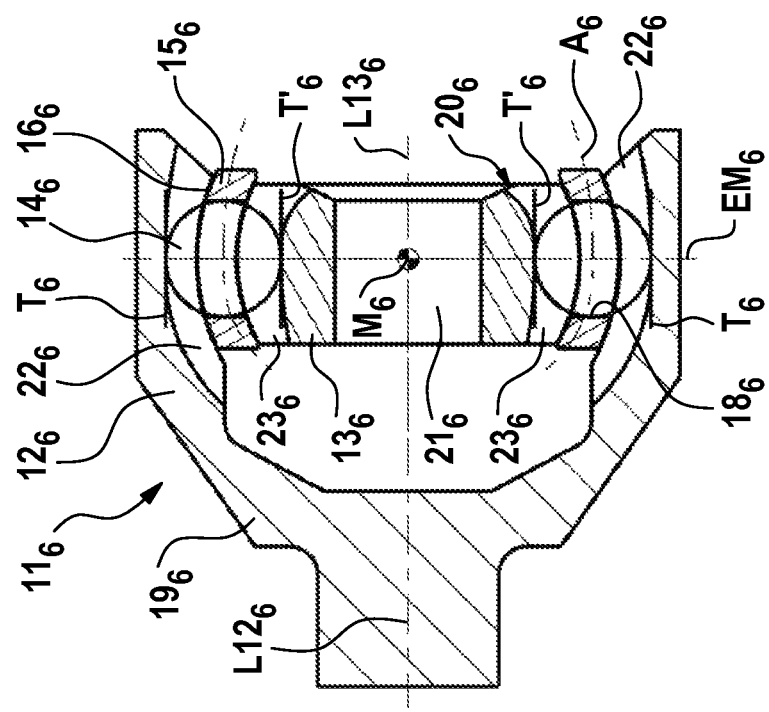

FIG. 6a) shows an exemplary constant velocity joint in a sixth embodiment in a longitudinal section in an aligned position.

FIG. 6b) shows the joint according to FIG. 6a) when articulated by an articulation angle of 40°.

FIG. 6c) shows the outer joint part of the joint according to FIG. 6a) in a longitudinal section.

FIG. 6d) shows the inner joint part of the joint according to FIG. 6a) in a longitudinal section.

FIG. 6e) shows the ball cage of the joint according to FIG. 6a) in a longitudinal section.

DESCRIPTION

FIGS. 1a) to 1h) will be described jointly below. They show an exemplary constant velocity universal joint 11. The constant velocity joint 11 comprises an outer joint part 12, an inner joint part 13, torque-transmitting balls 14, as well as a ball cage 15. The ball cage 15 has a spherical outer face 16 which is guided in the outer joint part 12, and a spherical inner cage face 17 which is guided on the inner joint part 13. The balls 14 are held in circumferentially distributed cage windows 18 in the ball cage 15 in the joint central plane EM when the joint is in an aligned condition. The outer joint part 12 is shown to comprise a longitudinal axis L12 and the inner joint part 13 a longitudinal axis L13. The point of intersection of the longitudinal axes L12, L13 and of the joint central plane EM forms the joint centre M.

Between the spherical outer face 16 of the ball cage 15 and the spherical inner face of the outer joint part 12 there is provided a small amount of play. The same applies to the paired faces between the spherical inner face 17 of the ball cage 15 and the spherical outer face of the inner joint part 13. As a result of the radial play between the paired faces of the ball cage 15 relative to the outer joint part 12 and the inner joint part 13, respectively, axial movements of the inner joint part 13 relative to the outer joint part 12 are possible to a limited extent. The resulting axial play between the inner joint part 13 and the outer joint part 12, in an advantageous way, permits a disconnection of vibrations when the joint is in an operational condition. The axial play may range between 0.2 mm and 1.0 mm.

The outer joint part 12 comprises a base 19 to which an attaching journal 24 is connected and an aperture 20 through which the inner joint part 13 can be mounted. Thus, the aperture can also be described as opening. The inner joint part 13 comprises an aperture 21 into which the journal of a driveshaft can be inserted in a rotationally fixed manner for transmitting torque. The position of the base 19 defines the axial direction "towards the attachment side" and the position of the aperture 20 defines the axial direction "towards the aperture side". These terms are also used with reference to the inner joint part 13, with the actual attachment of the shaft to the inner joint part 13 not being taken into account. It is understood that the outer joint part, instead of the base, can also be open towards the attachment side such as it is in the case of a disc joint.

The outer joint part 12 comprises outer ball tracks 22 and the inner joint part comprises inner ball tracks 23 of the constant velocity joint. In each case, an outer ball track 22 and an inner ball track 23 are positioned opposite one another and jointly form a pair of tracks in which a torque-transmitting ball 14 is guided. The opposed outer and inner ball tracks 22, 23 can be positioned in radial planes around the longitudinal axis L12, L13. The radial planes are arranged at the same angular distance from one another. However, it is also conceivable that two pairs of tracks each adjoining one another in the circumferential direction extend in planes which extend parallel relative to one another and which are positioned parallel to the longitudinal axis L12, L13. This embodiment is also referred to as "twin-ball" joint. When the joint is articulated, i.e., in the case of angular movements of the inner joint part 13 relative to the outer joint part 12, the balls 14 are guided out of the joint central plane EM at least approximately into the angle-bisecting plane between the longitudinal axis 12 of the outer joint part 12 and the longitudinal axis L13 of the inner joint part 13. "At least approximately" as used herein means that the plane formed by the ball centres of the balls 14 is positioned within an angular region of ±10% around the angle-bisecting plane and, more particularly, can correspond to same.

The shape of the ball tracks 22, 23 is particularly visible in FIGS. 1e) and 1f). The balls 14 are in contact with the outer ball tracks 22 in the outer joint part 12 and with the inner ball tracks 23 in the inner joint part 13. In a cross-sectional view, the balls 14 form an outer contact line K in the region of contact with the outer ball tracks 22 and the balls 14 form an inner contact line K' in the region of contact with the inner ball tracks 23. The balls 14 are shown being in contact with the track base of the ball tracks 22, 23, which track base contact does not necessarily have to take place. Thus the outer and inner contact lines K, K' can be in the track base, as shown, i.e., in a radial plane which contains the longitudinal axes L12, L13, or they can be in planes which extend parallel to the longitudinal axes. When the balls 14 move along the outer and inner ball tracks 22, 23, the centres of the balls 14 each define a respective centre line A, A'. The centre lines A, A' extend parallel to the respective contact line K, K'. For describing the ball tracks 22, 23 reference is either made to the contact lines K, K' in the track base, or to the contact line A, A' which is defined by the sum of the ball centres when the joint carries out angular movements. The outer centre line A describes the line of the ball centres of the balls 14A along the outer ball tracks 22 in the outer joint part 12 and A' describes the inner centre line of the associated inner ball tracks 23 in the inner joint part 13.

In the aligned position of the joint as illustrated in FIGS. 1a) and 1b), i.e. when the outer joint part 12 and the inner joint part 13 extend coaxially (articulation angle β=0°), the tangents T, T' at the balls 14 in the points of contact with the outer and inner ball tracks 22, 23, extend parallel to the respective longitudinal axis L12, L13. Because the tangents T, T' in said central region of the joint, which comprises at least the joint central plane EM, extend parallel relative to one another, the opening angle δ amounts to zero; the phrase "amounts to zero" is meant to include opening angles being substantially zero, due to manufacturing tolerances. The constant velocity joint 11 is thus axially load-free in said small articulation angle range, i.e., in said range substantially no forces occur between the ball tracks and the balls guided therein.

Below, a more detailed description of the special features of the presently disclosed constant velocity joint is given, more particularly of the design of the ball tracks. In particular, in connection with the present constant velocity joint and the design of the ball tracks, the following definitions apply:

The tangent angle α defines the angle which is enclosed between a tangent T to a centre line A, A', respectively contact line K, K', of the outer joint part 12 or inner joint part 13 in any track point, and the respective longitudinal axis L12, 13 of the outer joint part 12 or inner joint part 13.

The joint articulation angle β defines the angle which is enclosed between the longitudinal axis L12 of the outer joint part 12 and the longitudinal axis L13 of the inner joint part L13. When the joint is in the aligned position, the joint articulation angle β amounts to zero.

The track angle β/2 defines the angle which is enclosed between the joint central plane EM and a radius around the joint centre M to the ball centre. In every angular position of the joint, the track angle β/2 always amounts to half the joint articulation angle β.

The track portion angle γ of a circular-arch-shaped track portion defines the angle over which said circular-arch-shaped track portion extends with a constant radius R around the radius centre M of said radius R.

The opening angle δ defines the angle which is enclosed between the tangent T to the outer ball track and the tangent T' to the respective inner ball track, said tangents T, T' each extending through the respective contact point with the ball.

The joint central plane EM is defined by the ball centres of the torque transmitting balls 14 when the joint is in the aligned position.

The reference radius RR for the ball centre line A of the outer joint part 12 and, respectively, for the ball centre line A' of the inner joint part, is defined from the joint centre M to a central plane intersection point PE between the respective centre line A, A' and the joint central plane EM.

The reference radius RR for the centre lines A, A' defines a respective reference circular arch CR.

FIGS. 1a) to 1h) show a first embodiment of an exemplary constant velocity joint 11. FIG. 1e) shows the outer joint part 12 with its centre line A and the contact line K which extend parallel relative to one another. The centre line A of the outer joint part 12, starting from the aperture end towards the attachment end, in the sequence as given, comprises an aperture side portion Ao which extends from the aperture side of the outer joint part 12 towards the central plane EM, a central portion Az continuously adjoining the aperture side portion Ao, and an attachment side portion Aa which continuously adjoins the central portion Az.

Accordingly, the centre line A' of the inner joint part 13, starting from the aperture end towards the attachment end, in the sequence as given, comprises an aperture side portion Ao', a central portion Az' continuously adjoining same, and an attachment side portion Aa' continuously adjoining the latter.

The central track portion 22z of the outer ball track 22 and the central track portion 23z of the inner ball track 23 are positioned inside a joint articulation region $\beta_z$ of ±2° around the joint central plane EM, and comprise at least the sectional region with the joint central plane EM. It is clear, particularly from FIG. 1b), that an outer central contact line tangent T to the outer contact line K within the outer central track portion extends parallel to an inner central contact line tangent T' to the inner contact line K' within the inner central track portion. This embodiment ensures that no axial forces whatsoever act from the ball tracks 22, 23 on the balls 14, which has a friction-reducing effect on the joint. The opening angle $\delta$ enclosed between the central contact line tangents T, T', for at least one point within said central track portions 22z, 23z, equals zero ($\delta=0°$).

Furthermore, especially in FIGS. 1c) and 1d) which show the constant velocity joint 11 at an articulation angle $\beta$ of 20° and 40° respectively, it can be seen that the outer and inner ball tracks 22, 23 are designed such that in the joint articulation plane, opening angles $\delta$ are generated at the balls 14o moving from the joint central plane EM towards the aperture end (upper half of the Figure) and at the ball 14a moving from the joint central plane EM towards the attachment end (lower half of the Figure), wherein said opening angles $\delta$ do not equal zero and open in the same axial direction. In other words, the resulting axial forces acting through the opening angles $\delta$ from the ball tracks 22, 23 on to the balls 14 point in the same axial direction.

The opening angles $\delta$ are each enclosed by an outer contact line tangent T to the outer contact line K and by an inner contact line tangent T' to the inner contact line K', said outer and inner tangents T, T' each extending through a respective contact point of the ball 14 and the respective outer and inner ball track 22, 23. It can be seen that for an articulation angle $\beta$ of 20° at the ball 14o moving in the joint articulation plane towards the aperture end a first opening angle $\delta 20o$ is formed between the outer tangent T20o and the inner tangent T20o', whereas at the ball 14a moving in the joint articulation plane EB towards the attachment end a second opening angle $\delta 20o$ is formed between the outer tangent T20a and the inner tangent T20a'. In the case of a larger articulation angle $\beta$ of 40°, the opening angle $\delta 40o$ at the aperture side ball and the opening angle $\delta 40a$ at the attachment side ball are greater than in the case of an articulation angle of 20°. Said opening angles $\delta$ are relatively small if compared with prior art fixed joints, which leads to lower friction losses between the components moving relative to one another. The ball tracks are preferably designed such that the first and the second opening angles are at least approximately of the same size. However, certain deviation in size between the first and the second opening angles are permissible, for instance within a range of up to ±10%.

Theoretically it is conceivable that, at larger articulation angles $\beta$ which are greater than 40°, the opening angles $\delta$ at the aperture side balls and at the attachment side balls 14 also point in opposed axial directions. In any case, the ball tracks are designed such that the opening angles $\delta$ at the aperture side balls and at the attachment side balls 14 open in the same axial direction, if the joint is articulated at angles outside the small articulation angle region of ±2°, at least up to an articulation angle $\beta$ of at least 20°, more particularly up to 40°. This measure ensures good cage control conditions, more particularly also at large joint articulation angles $\beta$.

FIG. 1h) shows in greater detail the track shape of the outer ball tracks 22 of the outer joint part 12. The reference radius RR has a radius centre MR positioned in the joint centre M and an end (perimeter) defined by the point of intersection between the centre line A and the joint central plane EM. The individual track portions 22o, 22z, 22a and the individual centre line portions Ao, Az, Aa, respectively, are characterised by their different curvatures and radii.

It can be seen that the centre line A in the aperture side track portion Ao is positioned radially outside the reference circular arch CR. This can be achieved by a radial offset of the track centre towards the outer ball track 22 or also by an elliptical track shape. In the present embodiment, the aperture side portion Ao of the centre line A is formed by a circular arch with a uniform radius Ro around the centre Mo (shown in FIG. 1e), with the centre Mo being positioned in the joint central plane EM and, with reference to the longitudinal axis L12, being offset away from the outer ball track 22.

The central track portion Az is positioned in the joint central plane EM and forms the transition from the aperture side track portion Ao to the attachment side track portion Aa. Within the central track portion Az, the centre line A intersects the circular reference arch CR. To that extent, the centre line A comprises a curvature changing point inside the central track portion Az, said point being positioned in the intersection of the centre line A with the joint central plane EM. In the curvature changing point, the curvature of the centre line A changes, i.e. from the greater radius Ro of the aperture side circular arch Ao to the smaller radius Ra of the attachment side track portion Aa.

The attachment side track portion Aa is positioned radially inside the reference circular arch CR defined by the reference radius RR. Accordingly, in the rear track portion 22a the track base, and the contact line K of the outer ball tracks 22, radially inwardly leaves a respective reference circular arch extending parallel to the reference circular arch CR of the centre line A. In concrete terms it is disclosed that the attachment side portion Aa is formed by a circular arch with a uniform radius Ra around a centre Ma. It can be seen that the radius Ra is clearly smaller than the radius Ro and that the centre Ma is offset towards the ball track 22 in the joint central plane EM. At its base-facing end, the attachment side track portion Aa comprises a straight section. Because the attachment side track portion Aa extends inside the reference circular arch CR, tangents to the centre line A and at the contact line K, respectively, form relatively large tangent angles $\alpha$ in this rear track portion Aa. The increased tangent angles $\alpha$ lead to an improved introduction of force from the balls 14 to the ball cage 15 which, in consequence, can be controlled more easily on to the angle-bisecting plane and generates less undesirable noise.

It is understood that the track shape of the outer ball track 22 and, in consequence, also the track shape of the inner ball track 23, can also be achieved in ways which differ from the circular-arch-shaped partial portions as shown. Thus, each one of the track portions Ao, Az, Aa can comprise a shape which deviates from a circular arch, such as an elliptical, spiral-shaped and/or hyperbolic shape or a mathematical function of a higher order.

FIG. 1f) shows the inner joint part 13 of the exemplary constant velocity joint 11 as a detail in a longitudinal section through two opposed ball tracks 23. The ball centre line A' of the inner joint part 13 is designed to be complementary to the ball centre line A of the outer joint part 12. This means that the ball centre line A' of the inner joint part 13 is mirror-symmetric to the ball centre line A of the outer joint part 12 with reference to the joint centre plane EM, and with reference to the angle-bisecting plane between the longitudinal axis L12 of the outer joint part 12 and the longitudinal axis L13 of the inner joint part 13.

To that extent, to avoid any repetition, in respect of the course taken by the ball centre lines A' of the inner joint part 13, reference is made to the description of the ball tracks 22 of the outer joint part 12.

FIG. 1g) shows the ball cage as a detail. It can be seen that the first surface centre M16 of the spherical face 16 and the second surface centre M17 of the spherical face 17 each feature an axial distance (offset) with reference to the joint central plane EM in opposed directions away from the joint central plane EM. As a result of the cage offset, the degree of wrapping of the balls in the attachment side track portions of the inner and outer ball tracks 22, 23 is increased.

FIGS. 2a) to 2e), which will be described jointly below, show an exemplary constant velocity joint in a further embodiment which largely corresponds to the constant velocity joint according to FIG. 1, so that, as far as common features are concerned, reference is made to the above description, with identical components and components corresponding to one another being given the same reference numbers with the annotation "2".

The only difference is that the spherical inner face of the outer joint part and the spherical outer face of the ball cage 15$_2$ are designed so as to be concentric relative to the joint centre M$_2$. Accordingly, the spherical pairs of faces between the ball cage 15$_2$ and the outer joint part 12$_2$, respectively between the ball cage 15$_2$ and the inner joint part 13$_2$, extend concentrically relative to the joint centre M$_2$. In other words, the constant velocity joint according to the present embodiment does not have a so-called cage offset. This results in shorter track depths at the attachment side track portions of the outer and inner ball tracks and thus, in a cross-sectional view, smaller wrap angles around the balls received in the tracks. Furthermore, the tangent angles of tangents to the contact lines, respectively centre lines of the ball tracks are slightly smaller. Otherwise, the present joint according to FIGS. 2a) to 2e) corresponds to the embodiment according to FIG. 1, so that, in that respect, reference is made to the above description.

FIGS. 3a) to 3e), which will be described jointly below, show an exemplary constant velocity joint in a third embodiment which largely corresponds to the constant velocity joint according to FIG. 1, so that, as far as common features are concerned, reference is made to the above description, with identical components and components corresponding to one another being given the same reference numbers with annotation "3".

In contrast to the above embodiments, the outer and inner ball tracks of the constant velocity joint shown in FIGS. 3a) to 3e) are undercut-free. Joints with undercut-free tracks are also referred to as UF joints (undercut-free), with the special feature referring to the concrete embodiment of the outer and inner ball tracks. The centre lines A$_3$ of the outer ball tracks comprise an aperture side track portion Ao$_3$, an adjoining central track portion Az$_3$ and an attachment side track portion Aa$_3$ which adjoins the central track portion Az$_3$. It can be seen that the aperture side track portion Ao$_3$ extends in a straight line, i.e., parallel to the longitudinal axis L12$_3$ of the outer joint part 12$_3$. This also applies to the central track portion Az$_3$ which is positioned in the joint central plane EM$_3$ or rather contains same. The rear track portion Aa$_3$ which adjoins the central track portion Az$_3$ beyond the joint central plane EM$_3$ is curved, with the track shape in said rear track portion Az$_3$ corresponding to that of the constant velocity joint according to FIG. 1.

Thus, also in the present constant velocity joint with undercut-free ball tracks, the aperture side track portion Ao$_3$ extends radially outside the reference radius RR$_3$, whereas the rear track portion Aa$_3$ extends radially inside the reference radius RR$_3$. Thus, as can be seen particularly in FIG. 3b), which shows the constant velocity at an articulation angle β$_3$ of 40°, the outer and inner ball tracks 22$_3$, 23$_3$ are designed such that in the joint articulation plane EB$_3$ opening angles δ$_3$ are formed at the ball 14o$_3$ moving from the joint central plane EM$_3$ towards the aperture end (upper half of the Figure) and at the ball 14a$_3$ moving from the joint central plane EM$_3$ towards the attachment end (lower half of the Figure), which opening angles δ$_3$ are not equal to zero and open in the same axial direction. This design ensures good cage control conditions.

Furthermore, it can be seen in FIG. 3a), which shows the joint in the aligned condition, that the central track portion Az$_3$ of the outer ball track 22$_3$ and the central track portion Az'$_3$ of the inner ball track 23$_3$ are positioned inside a joint articulation angle range β$_{z3}$ of ±2° around the joint central plane EM$_3$ and contain the intersection region with the joint central plane EM$_3$. An outer contact line tangent T$_3$ to the outer contact line K$_3$ within the outer central track portion Az$_3$ extends parallel to a contact line tangent T'$_3$ to the inner contact line K'$_3$ within the inner central track portion Az'$_3$. In this way, no axial forces act from the ball tracks 22$_3$, 23$_3$ to the balls 14$_3$, which has a friction-reducing effect on the joint. In at least one ball position within said central track portions Az$_3$, Az'$_3$, the opening angle δ$_3$ equals zero. In addition, as far as common features are concerned, reference is made to the embodiment according to FIG. 1.

FIGS. 4a) to 4e), which will be described jointly below, show an exemplary constant velocity joint in a further embodiment which largely corresponds to the constant velocity joint according to FIG. 3, so that, as far as common features are concerned, reference is made to the above description, with identical components and components corresponding to one another being given the same reference numbers with annotation "4".

The only difference is that the spherical inner face of the outer joint part and the spherical outer face of the ball cage are concentric relative to the joint centre M$_4$. Accordingly, the spherical pairs of faces between the ball cage 15$_4$ and the outer joint part 12$_4$, respectively between the ball cage 15$_4$ and the inner joint part 13$_4$, extend concentrically relative to the joint centre M$_4$. In other words, the constant velocity joint according to FIGS. 4a) to 4e) does not have a so-called cage offset. This results in shorter track depths at the attachment side track portions of the outer and inner ball tracks and thus, in a cross-sectional view, smaller wrap angles around the balls received in the tracks. Furthermore, the tangent angles of tangents to the contact lines, respectively centre lines of the ball tracks are slightly smaller. Otherwise, the present joint corresponds to the embodiment according to FIG. 3, so that, in that respect, reference is made to the above description.

FIGS. 5a) to 5e), which will be described jointly below, show an exemplary constant velocity joint in a fifth embodiment which largely corresponds to the constant velocity joint according to FIG. 1, so that, as far as common features are concerned, reference is made to the above description, with identical components and components corresponding to one another being given the same reference numbers with annotation "5".

A special feature of the present embodiment is that the central portion $Az_5$ is designed along its entire length such that the contact line tangent $T_5$ at the outer contact line $K_5$ within the central track portion $Az_5$ extends parallel to the inner contact line tangent $T'_5$ at the inner contact line $K'_5$ within the inner central track portion $Az'_5$, respectively parallel to the longitudinal axis $L12_5$. In other words, the central track portion $Az_5$, $Az'_5$ extends in a straight line, i.e. parallel to the respective longitudinal axis $L12_5$, $L13_5$ of the associated joint part $12_5$, $13_5$. When the joint $11_5$ is an aligned position, no axial forces act from the ball tracks $22_5$, $23_5$ to the balls $14_5$, which has a friction-reducing effect on the joint. Along the entire length of the central track portions $Az_5$, $Az'_5$, the opening angle $\delta_5$ amounts to zero.

Otherwise, the present constant velocity joint corresponds to that shown in FIG. 1 to the description of which reference is hereby made. More particularly, the aperture side and attachment side track portions $Ao_5$ and $Aa_5$ adjoining the respective central track portions $Az_5$, $Az'_5$ are designed identically, as in the embodiment according to FIG. 1. Thus, also in the present embodiment having longer axis-parallel central track portions $Az_5$, $Az'_5$, with respect to the outer joint part $12_5$, the aperture side track portion $Ao_5$ extends radially outside the reference radius $RR_5$, whereas the attachment side track portion $Aa_5$ extends radially inside the reference radius $RR_5$. Thus, as can be seen in FIG. 5b) which shows the constant velocity joint at an articulation angle $\beta_5$ of 40°, the outer and inner ball tracks $22_5$, $23_5$ are designed such that in the joint articulation plane $EB_5$, opening angles $\delta_5$ are formed at the ball $14o_5$ moving from the joint central plane $EM_5$ towards the aperture end (upper half of the Figure) and at the ball $14a_5$ moving from the joint central plane $EM_5$ towards the attachment end (lower half of the picture), which opening angles $\delta_5$ do not equal zero and open in the same axial direction. This ensures good cage control conditions.

FIGS. 6a) to 6e), which will be described jointly below, show an exemplary constant velocity joint in a further embodiment which largely corresponds to the constant velocity joint according to FIG. 5, so that, as far as common features are concerned, reference is made to the above description, with identical components and components corresponding to one another being given the same reference numbers with annotation "6".

The only difference is that the spherical inner face of outer joint part and the spherical outer face of the ball cage $15_6$ extend concentrically relative to the joint centre $M_6$. Accordingly, it is disclosed that also the spherical pairs of faces between the ball cage $15_6$ and the outer joint part $12_6$, respectively between the ball cage $15_6$ and the inner joint part $13_6$, extend concentrically relative to the joint centre $M_6$. In other words, the constant velocity joint according to FIGS. 6a to 6e) does not comprise a so-called cage offset. In consequence, at the attachment side track portions of the outer and inner ball tracks, there are reduced track depths and thus, in a cross-sectional view, smaller wrap angles around the balls received in the tracks. Furthermore, the tangent angles at the contact lines and at the centre lines of the ball tracks are somewhat smaller. Otherwise, the present joint corresponds to the embodiment according to FIG. 5, so that, to that extent, reference is made to the above description.

Advantageously, all of the above-described constant velocity joints $11_6$, within a small articulation angle range around the joint central plane $EM_6$, at least in one sectional plane, comprise a track shape in which there exist no resulting axial forces between the ball tracks $22_6$, $23_6$ and the balls $14_6$ along the ball tracks. This means that the ball cage $15_6$, at least in this region, is free from axial forces with reference to the contact faces relative to the outer joint part $12_6$ and the inner joint part $13_6$, respectively. Overall, when the joint is operational, the friction forces and thus the friction losses within this central portion are low. At larger articulation angles, i.e., when the constant velocity joint operates outside the small articulation angle range, the ball tracks $12_6$, $13_6$ comprise a shape which, both at the balls $14o_6$ running in the joint articulation plane $EB_6$ into the aperture side track portions $Ao_6$ and also at the balls $14a_6$ running into the attachment side track portions $Aa_6$, generates opening angles $\delta_6$ extending into corresponding axial directions. This measure ensures good cage control conditions at larger articulation angles.

The invention claimed is:

1. A constant velocity joint, comprising:
    an outer joint part with a first longitudinal axis and outer ball tracks, wherein the outer joint part comprises an attachment side and an aperture side;
    an inner joint part with a second longitudinal axis and inner ball tracks, wherein the outer ball tracks and the inner ball tracks form pairs of tracks;
    a torque transmitting ball in each pair of tracks;
    a ball cage arranged between the outer joint part and the inner joint part, and comprising circumferentially distributed cage windows, each of which receives at least one of the torque transmitting balls;
    wherein the ball cage holds the balls in a joint central plane when the inner joint part is arranged coaxially relative to the outer joint part, and wherein the first longitudinal axis of the outer joint part and the second longitudinal axis of the inner joint part form a joint articulation plane when the inner joint part is articulated relative to the outer joint part by an articulation angle which deviates from zero degrees;
    wherein in each angular position of the constant velocity joint an opening angle is formed between an outer tangent to the outer ball track and an inner tangent to the inner ball track when viewed in the joint articulation plane, wherein said outer tangent extends through an outer contact point between the ball and the outer ball track and wherein said inner tangent extends through an inner contact point between the ball and the inner ball track;
    wherein at least one of the pairs of tracks is configured such that:
        for at least one joint articulation angle within a small articulation angle range which comprises the joint central plane, the opening angle amounts to substantially zero degrees; and
        for at least one joint articulation angle within a large articulation angle range which comprises joint articulation angles which are larger than a maximum joint articulation angle of the small articulation angle range, an aperture-side opening angle of a ball moving in the joint articulation plane towards the aperture side of the outer joint part and an attachment-side opening angle of a ball moving in the joint articulation plane towards the attachment side of the outer joint part are unequal to zero and open in a same axial direction.

2. The constant velocity joint according to claim 1, wherein the small joint articulation angle range comprises joint articulation angles which amount to a maximum of two degrees.

3. The constant velocity joint according to claim 1, wherein the at least one pair of tracks is configured such that at each first joint articulation angle inside the small articulation angle range where an opening angle is unequal to zero, an aperture-side opening angle of a ball moving in the joint articulation plane towards the aperture side of the outer joint part, and an attachment-side opening angle of a ball moving at the same joint articulation angle in the joint articulation plane towards the attachment side of the outer joint part, open in a same axial direction.

4. The constant velocity joint according to claim 1,
wherein for articulation angles being within the large joint articulation angle range and having a maximum of eight degrees, at least one of the aperture-side and attachment-side opening angles amounts to a value greater than zero and smaller than 8°.

5. The constant velocity joint according to claim 1,
wherein the large articulation angle range adjoins the small articulation angle range.

6. The constant velocity joint according to claim 1,
wherein the large joint articulation angle range comprises joint articulation angles which amount at least up to twenty degrees.

7. The constant velocity joint according to claim 1,
wherein the ball cage comprises a spherical outer face arranged to guide the ball cage relative to an inner face of the outer joint part, and a spherical inner face arranged to guide the ball cage relative to an outer face of the inner joint part; and
wherein between a center of the spherical outer face and a center of the spherical inner face there is provided an axial offset.

8. The constant velocity joint according to claim 7, wherein the outer center line in the attachment-side track portion of the outer joint part extends radially inside the circular arch portion defined by the reference radius, and wherein the outer center line in the aperture-side track portion of the outer joint part extends radially outside the circular arch portion defined by the reference radius;
wherein the center of the spherical outer face of the ball cage comprises an axial offset relative to the joint center towards the aperture side; and
wherein the center of the spherical inner face of the ball cage comprises an axial offset relative to the joint center towards the attachment side.

9. The constant velocity joint according to claim 1,
wherein the centers of the balls, when moving along the outer and inner ball tracks, define an outer center line with respect to the outer joint part and an inner center line with respect to the inner joint part,
wherein the outer and inner center lines, along their respective length, each comprise at least two track portions with curvatures that differ from one another.

10. The constant velocity joint according to claim 9,
wherein the outer and inner center lines each comprise a change in curvature in a central track portion within at least one of the small articulation angle range and a point of intersection with the joint central plane.

11. The constant velocity joint according to claim 9,
wherein the outer and inner center lines each comprise a turning point in at least one of the central track portion and the point of intersection with the joint central plane.

12. The constant velocity joint according to claim 9,
wherein the outer ball track is configured such that the outer center line in the small articulation angle range extends parallel to the first longitudinal axis of the outer joint part, and wherein the inner ball track is configured such that the inner center line in the small articulation angle range extends parallel to the second longitudinal axis of the inner joint part.

13. The constant velocity joint according to claim 9,
wherein the outer ball track is configured such that the outer center line in the small articulation angle range is formed by an outer circular arch around the joint center, and wherein the inner ball track is configured such that the inner center line in the small articulation angle range is formed by an inner circular arch around the joint center.

14. The constant velocity joint according to claim 9,
wherein the outer ball track is configured such that the outer center line, in an attachment-side track portion of the outer joint part extends one of radially inside and radially outside a circular arch portion defined by a reference radius, wherein the reference radius extends around the joint center through a central plane intersection of the center line and the joint central plane.

15. The constant velocity joint according to claim 14,
wherein the outer ball track is configured such that the outer center line in the attachment-side track portion of the outer joint part comprises at least one of:
a circular arch portion with a radius around a circular arch center, which circular arch center is positioned in the joint central plane and comprises a radial offset relative to the first longitudinal axis of the outer joint part towards the outer ball track; and
a circular arch portion with a radius around a circular arch center, which circular arch center is positioned on the first longitudinal axis of the outer joint part and comprises an axial offset relative to the joint central plane towards the attachment side.

16. The constant velocity joint according to claim 9,
wherein the outer ball track is configured such that the outer center line, in an aperture-side track portion of the outer joint part, extends one of radially outside and radially inside a circular arch portion defined by a reference radius, wherein the reference radius extends around the joint center and through a central plane intersection of the center line and the joint central plane.

17. The constant velocity joint according to claim 16,
wherein the outer ball track is configured such that the outer center line in the aperture-side track portion of the outer joint part comprises at least one of:
a circular arch portion with a radius around a circular arch center, which circular arch center is positioned in the joint central plane and comprises a radial offset relative to the longitudinal axis of the outer joint part away from the outer ball track;
a circular arch portion with a radius around a circular arch center, which circular arch center is positioned on the first longitudinal axis of the outer joint part and comprises an axial offset relative to the joint central plane towards the aperture side.

18. The constant velocity joint according to claim 1,
wherein the ball tracks are configured such that, within the large articulation angle range, the opening angles at all balls open in a same axial direction when viewed in the joint articulation plane.

19. The constant velocity joint according to claim 1,
wherein all ball tracks are configured such that, for at least one joint articulation angle inside the small joint articulation angle range, the opening angles at all the balls amount to zero degrees.

20. The constant velocity joint according to claim 1,
wherein the inner ball track, with reference to an angle-bisecting plane between the first longitudinal axis of the outer joint part and the second longitudinal axis of the inner join part, is configured to be mirror-symmetrical relative to the outer ball track.

* * * * *

UNITED STATES PATENT AND TRADEMARK OFFICE
CERTIFICATE OF CORRECTION

| | | |
|---|---|---|
| PATENT NO. | : 9,133,887 B2 | Page 1 of 1 |
| APPLICATION NO. | : 14/386895 | |
| DATED | : September 15, 2015 | |
| INVENTOR(S) | : Wolfgang Hildebrandt et al. | |

It is certified that error appears in the above-identified patent and that said Letters Patent is hereby corrected as shown below:

In the claims:

Column 16, in line 66, claim 3, replace "each first joint" with -- each joint --.

Signed and Sealed this
Second Day of February, 2016

Michelle K. Lee
*Director of the United States Patent and Trademark Office*